US009800911B2

United States Patent
Smith et al.

(10) Patent No.: US 9,800,911 B2
(45) Date of Patent: Oct. 24, 2017

(54) TECHNOLOGIES FOR SELECTIVE CONTENT LICENSING AND SECURE PLAYBACK

(71) Applicant: INTEL CORPORATION, Santa Clara, CA (US)

(72) Inventors: Ned M Smith, Beaverton, OR (US); Rajesh Poornachandran, Portland, OR (US); Yeugeniy Epshteyn, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/751,901

(22) Filed: Jun. 26, 2015

(65) Prior Publication Data

US 2016/0381405 A1 Dec. 29, 2016

(51) Int. Cl.
*H04N 21/254* (2011.01)
*H04N 21/4627* (2011.01)
(Continued)

(52) U.S. Cl.
CPC ......... *H04N 21/2541* (2013.01); *G06F 21/00* (2013.01); *H04N 21/2353* (2013.01);
(Continued)

(58) Field of Classification Search
CPC ......... H04N 21/23439; H04N 21/2541; H04N 21/2662; H04N 21/6125; H04N 21/6334;
(Continued)

(56) References Cited

U.S. PATENT DOCUMENTS 8,924,727 B2   12/2014 Smith et al.
9,473,730 B1 * 10/2016 Roy ................. H04N 21/482
(Continued)

FOREIGN PATENT DOCUMENTS

WO   2015094245 A1   6/2015

OTHER PUBLICATIONS

Hartung, et al., "DRM Protected Dynamic Adaptive HTTP Streaming," Ericsson GmbH, Research Multimedia Technologies, MMSys '11, Feb. 23-25, 2011, pp. 277-282.
(Continued)

*Primary Examiner* — Hai V Tran
(74) *Attorney, Agent, or Firm* — Grossman, Tucker, Perreault & Pfleger, PLLC

(57) ABSTRACT

Technologies for selectively licensing segments of source content are described. In some embodiments the technologies enable a user of a client device to select, license, and use one or more segments of source content, without the need to obtain a license to the source content as a whole. Systems, methods, and computer readable media utilizing such technologies are also described. In some embodiments, the technologies can enable digital rights management or other restrictions imposed on a content segment to be enforced, even when the content segment is incorporated into diverse content such as a content mashup. The technologies may also enable independent tracking of information regarding the use and/or payback of content segments, even when such segments are included in diverse content.

22 Claims, 8 Drawing Sheets

(51) Int. Cl.
*H04N 21/835* (2011.01)
*H04N 21/235* (2011.01)
*H04N 21/239* (2011.01)
*G06F 21/00* (2013.01)
*H04N 21/8355* (2011.01)

(52) U.S. Cl.
CPC ..... *H04N 21/2396* (2013.01); *H04N 21/4627* (2013.01); *H04N 21/8355* (2013.01)

(58) Field of Classification Search
CPC ........... H04N 21/8543; H04N 21/2347; H04N 21/2353; H04N 21/2396; H04N 21/4405; H04N 21/4627; H04N 21/63345; H04N 21/84; G06F 21/10; G06F 2221/2107
See application file for complete search history.

(56) References Cited

U.S. PATENT DOCUMENTS

| | | | |
|---|---|---|---|
| 2006/0167815 A1* | 7/2006 | Peinado | G06F 21/10 705/59 |
| 2006/0212400 A1 | 9/2006 | Kamperman et al. | |
| 2007/0124251 A1 | 5/2007 | Shimizu et al. | |
| 2008/0320551 A1 | 12/2008 | Grigorovitch et al. | |
| 2009/0313665 A1* | 12/2009 | Rouse | H04N 21/63345 725/93 |
| 2012/0060031 A1* | 3/2012 | Huang | H04N 21/63345 713/168 |
| 2013/0073466 A1 | 3/2013 | Farrugia et al. | |
| 2013/0212695 A1 | 8/2013 | Schnell | |
| 2013/0290697 A1* | 10/2013 | Wang | H04N 21/23439 713/150 |
| 2015/0170197 A1 | 6/2015 | Smith et al. | |
| 2015/0286369 A1* | 10/2015 | Pontual | G06F 3/04842 715/719 |

OTHER PUBLICATIONS

International Search Report and Written Opinion issued in PCT Application No. PCT/US2016/034724, dated Sep. 7, 2016, 14 pages.

* cited by examiner

TECHNOLOGIES FOR SELECTIVE CONTENT LICENSING AND SECURE PLAYBACK

FIELD

The present disclosure relates to technologies for selectively licensing portions of source content. More particularly, the present disclosure relates to technologies that can enable licensing of one or more segments of source content, without the need for a license to the entirety of the source content. Devices, systems, methods and computer readable media utilizing such technologies are also described.

BACKGROUND

Existing digital rights management (DRM) technologies for premium protected content (hereinafter, "source content") generally require a user to obtain a license to the entirety of the source content before it may be consumed. As a result, users wishing to view only a selected portion of the source content may be unable to do so without obtaining a license to the source content as a whole. This is particularly prevalent in "pay-per-view" movie DRM schemes, which may require a user to pay the price for the full length of a movie, even if the user only wishes to view a selected portion of that movie.

For the foregoing reason many existing DRM technologies do not easily support "fair-use" practices for content sharing use cases, e.g., where relatively small segments of source content may be shared/displayed without a license from the content owner. This is in part due to the fact that many existing DRM technologies encrypt or otherwise protect source content as a whole with a single content encryption key. This may hinder or prevent a user from sharing a segment of the source content unless he/she obtains the content encryption key, which as noted above often requires a license to the source content as a whole.

With the above in mind interest has grown tremendously in the production of diverse content, e.g., content such as audio and/or video media that is the product of contributions from multiple sources. Diverse content may include, for example, a movie that includes a first content segment produced by a first contributor (or group of contributors) and a second content segment that is produced by a second contributor (or group of contributors). In instances where the diverse content is in the form of a "mashup," the first and second content segments may be derived from different source content (i.e., first source content and second source content, respectively), after which they may be combined by a mashup artist in a desired manner to form the mashup.

While diverse content such as content mashups can be highly entertaining, existing DRM technologies may not easily support their production for the same reasons noted above. For example, existing DRM technologies may require a mashup artist and mashup consumers to obtain a license to the entirety of the source content for each content segment that is to be included in the mashup. This can present a cumbersome and potentially expensive user experience, particularly if the content segments the mashup artist wants to use are relatively small/short, as compared to their corresponding source content.

In addition many content display technologies may support the ability to track user behavior with regard to content that is being consumed on a device. For example, content display technologies can track data regarding user viewing behavior (e.g., fast forwarding, rewinding, number of views, etc.), and provide that data to a content owner, e.g., in the form of metadata. Although such technologies can be effective to track user behavior with regard to a piece of content as a whole, they may be unable to track user behavior with regard to individual content segments in a piece of diverse content such as a content mashup.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
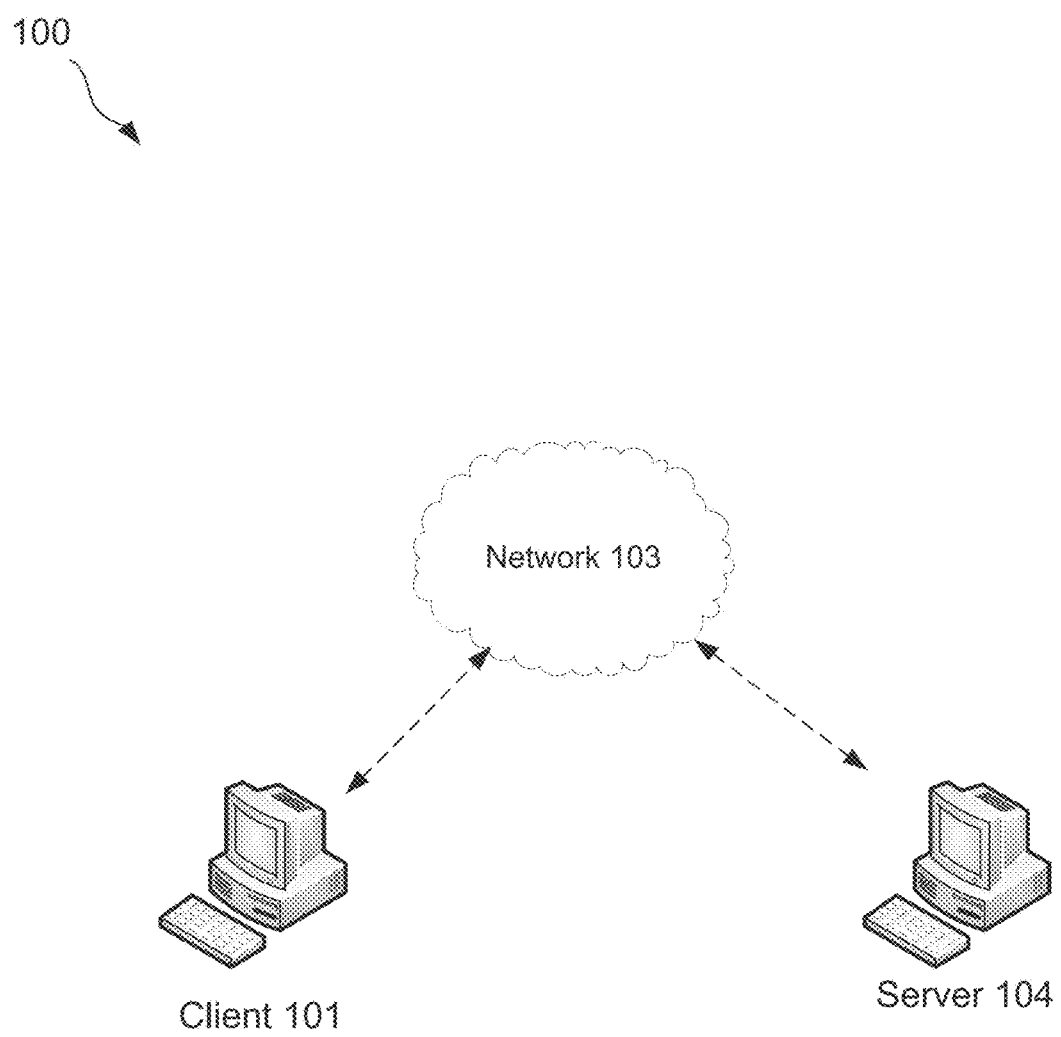
FIG. 1 depicts one example of a system for selective licensing of one or more content segments consistent with the present disclosure.

Although the following detailed description will proceed with reference being made to illustrative embodiments, many alternatives, modifications, and variations thereof will be apparent to those skilled in the art.

DETAILED DESCRIPTION

While the present disclosure is described herein with reference to illustrative embodiments for particular applications, it should be understood that such embodiments are exemplary only and that the invention as defined by the appended claims is not limited thereto. Those skilled in the relevant art(s) with access to the teachings provided herein will recognize additional modifications, applications, and embodiments within the scope of this disclosure, and additional fields in which embodiments of the present disclosure would be of utility.

As briefly described in the background many existing DRM technologies require users to obtain a license to the entirety of a piece of source content, even if the user only wishes to consume or otherwise utilize one or more segments of that source content. Such DRM technologies may therefore present an undesirable user experience, particularly with regard to users that wish to consume or otherwise use one or a plurality of relatively small segments of that source content. This may be particularly problematic in instances where a user wishes to create diverse content that includes one or more segments of source content that is/are not owned by the user.

With the foregoing in mind the present disclosure generally relates to technologies (e.g., systems, methods, devices, computer readable media, and the like) for selectively licensing one or more segments of source content. As will be described, such technologies may enable a user of a client device to license, obtain, and/or consume one or more segments of source content, without requiring the user to obtain a license to the source content as a whole. Such technologies may also facilitate other aspects of the present disclosure, which relate to the use of licensed segments of content in the production of diverse content, the consumption of such diverse content, and the tracking of usage information with regard to individual content segments in a piece of diverse content.

For the sake of clarity and ease of understanding, a segment of source content may be referred to herein as a "content segment." It should be understood that the term, "content segment" refers to some portion of corresponding source content. Source content may, for example, be in the form of audio and/or visual media. Source content may be understood to have a length which may be characterized in various ways, such as in terms of a total running time, a total number of frames, combinations thereof, and the like. A content segment may therefore have a length that is less than or equal to the total length of its corresponding source content, e.g., to some time and/or frame range within the total length of the source content.

By way of example, consider a use case in which a piece of source content has a total length of 60 seconds and/or 1800 frames. In such example, the term "content segment" may be understood correlate to a portion of the source content that is greater than 0 but less than or equal to 60 seconds long and/or is greater than 0 but less or equal to 1800 frames. For example, a content segment may refer to a 1, 5, 10, 15 or even 30 second portion of the source content, and/or which spans 30, 150, 300, 450 or even 900 frames of the source content. Of course the length of and number of frames in the content segment of this use case is for the sake of example only, and content segments of any suitable length and/or number of frames may be used. Moreover, it should be understood that multiple content segments may be defined from a single piece of source content. In such instances such content segments may be distinct from one another or overlap one another, as desired.

As used herein, the term "diverse content," is used to refer to content such as audio, video, imagery, text, markup, pictures, metadata, hyperlinks, encrypted, signed, and/or encoded data, source code, combinations thereof and the like, which is the product of the combination of multiple content segments. Each of the content segments in diverse content may be owned by the same content owner or by different content owners. Diverse content may therefore include a compilation and/or mash-up of content elements (which may each be audio, video, imagery, text, markup, etc. combinations thereof and the like) that are organized or arranged in a desired fashion. Without limitation, in some embodiments the diverse content described herein is in the form of audio, visual, or audiovisual media that is made up of a plurality of audio, visual, and/or audio visual content segments.

The technologies of the present disclosure may be implemented using one or more electronic devices. As used herein, the terms "electronic device," "device" and "devices" refer individually and/or collectively to any of the large number of electronic devices that may be configured to perform operations consistent with the present disclosure. Non-limiting examples of electronic devices that may be used in accordance with the present disclosure include any kind of mobile device and/or non-mobile device, such as cameras, cell phones, computer terminals, desktop computers, electronic readers, facsimile machines, kiosks, netbook computers, notebook computers, internet devices, payment terminals, personal digital assistants, media players and/or recorders, one or more servers, set-top boxes, smart phones, tablet personal computers, ultra-mobile personal computers, wired telephones, combinations thereof, and the like. Such devices may be portable or stationary.

The terms, "client and "client device" are used herein to refer to a device (or collection of devices) that may perform client operations consistent with the present disclosure. Such client operations may include, for example, obtaining licenses to one or multiple segments of source content, producing diverse content containing one or multiple licensed content segments, consuming diverse content containing one or multiple licensed content segments, providing payment for one or more licensed content segments, obtaining and/or providing usage data with regard to licensed content segments, combinations thereof, and the like. In instances where a client device is to utilize licensed content segments to prepare diverse content, such a device may be referred to herein as a "content creation device." In contrast when a client device is to consume one or more licensed content segments (either independently or in the form of diverse media), such a device may be referred to as a "consumption device." It should be understood that the terms "content creation device" and "consumption device" are used herein for the sake of clarity only, and that any of the devices described herein may be capable of acting as a content creation device or a consumption device, as appropriate. Without limitation in some embodiments the client devices described herein are in the form of a mobile device such as a smart phone, cell phone, internet enabled device, and the like, though of course the client devices need not be mobile devices and may be of any desired form factor.

The terms "server" and "server device" are used herein to refer to a device (or collection of devices) that may perform server operations consistent with the present disclosure. Such server operations may include, for example, issuing licenses to one or more content segments, providing licensed content segments to one or more client devices (e.g., content creation and/or consumption devices), receiving payment for licensed content segments, tracking/managing usage data with regard to licensed content segments, combinations thereof, and the like. For the sake of clarity, the present disclosure focuses on use cases in which a single server device may perform each of the aforementioned server functions, but it should be understood that such server functions may be performed by separate devices. For example, licensing of content segments may be performed by a first server device, the provision of licensed content segments to one or more client devices may be performed by a second server device, reception of payment may be performed by a third server device, and tracking/managing usage data with regard to licensed content segments may be performed by a fourth server device.

For the sake of clarity, many of the FIGS. illustrate example systems in accordance with the present disclosure as including a single client device and a single server device. It is emphasized that such illustrations are for the sake of example only, and that any number of client and server devices may be used. Indeed, the present disclosure envisions systems in which a plurality (e.g., 1, 5, 10, 20, 50, 100, or more) devices are used as client devices and/or server. Thus, while the present disclosure may refer to a client device (e.g., a content creation device and/or a consumption device) and/or a server device in the singular, such expressions should be interpreted as also encompassing the plural form. It is further noted that a client device described herein may serve as a server devices, e.g., for another client device. That is, a first client device in some embodiments may act as a server device for a second client device.

As used in any embodiment herein, the term "module" may refer to software, firmware and/or circuitry configured to perform one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may, collectively or individually, be embodied as circuitry that forms a part of one or more devices, as defined previously. In some embodiments, the modules described herein may be in the form of logic that is implemented at least in part in hardware to perform various functions consistent with the present disclosure (e.g., content licensing functions, content creation functions, content consumption functions, etc.).

With the foregoing in mind one aspect of the present disclosure relates to technologies (e.g., systems, methods, devices, computer readable media, and the like) for selectively licensing one or more content segments. In this regard reference is made to FIG. 1, which depicts one example of a system for selective licensing content consistent with the present disclosure. As shown, system 100 includes client device (client) 101 and server device (server) 104.

In some embodiments and as will be described below, client 101 may be configured to allow a user thereof to select content segments that he/she wishes to consume or otherwise use, and which may be provided by server 104 or a separate content server (not shown). More particularly and unlike previous content distribution systems, client 101 may be configured to allow the user to select and license one or more content segments of a piece of source content, without the need to obtain a license to the source content as a whole. Server 102 may be configured to negotiate or otherwise provide licensing terms governing content segment(s) requested by client 101, to provision or cause the provision of such content segments, and optionally to perform other operations (e.g., monetary and/or information collection operations) consistent with the present disclosure.

Figure 2:
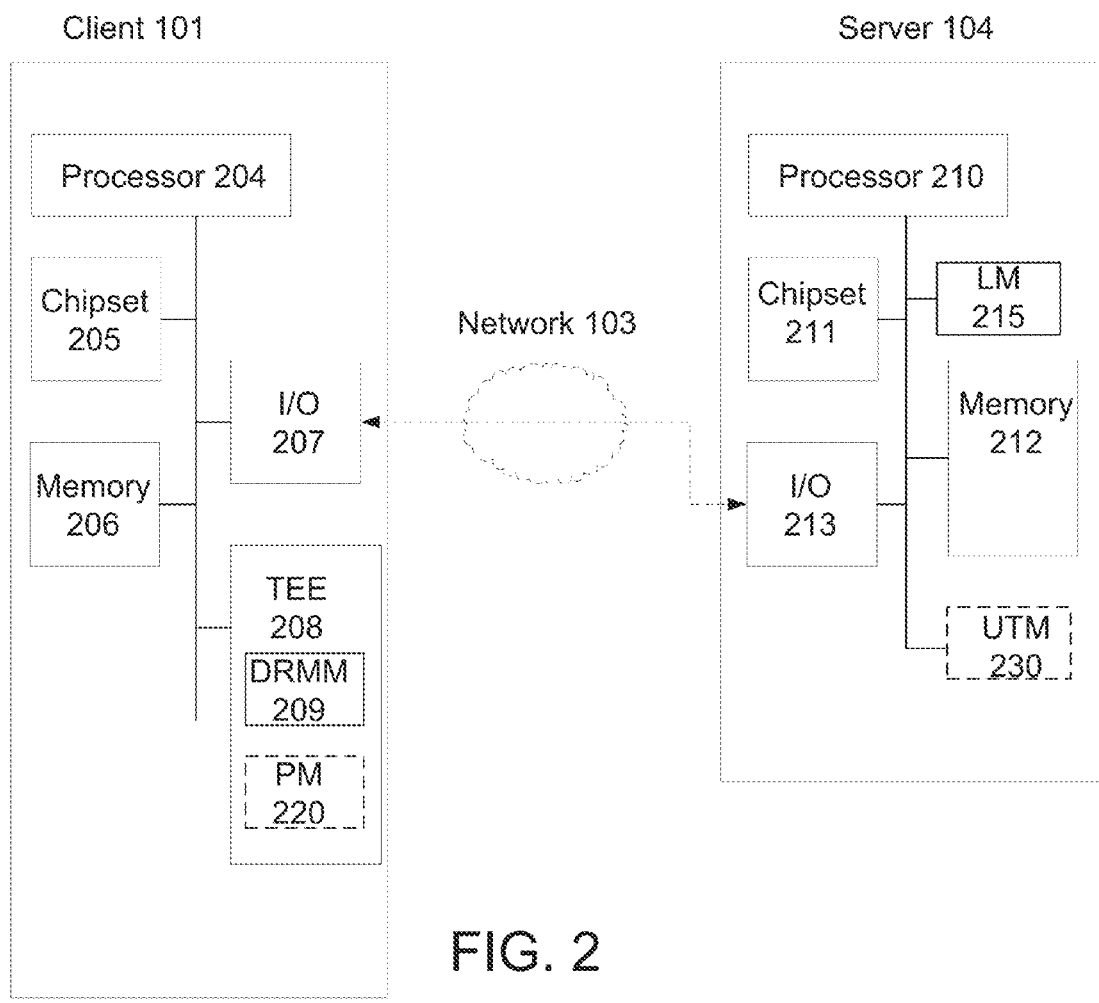
FIG. 2 is a block diagram of one example of a client/server architecture consistent with the present disclosure.

Reference is now made to FIG. 2, which provides a block diagram of example client and server device architecture consistent with various embodiments of the present disclosure. For the sake of simplicity and ease of understanding, the embodiment of FIG. 2 is illustrated with only a single client 101 and a single server 104, which have many of the same general components. Specifically, client 101 and server 104 each include a processor (i.e., processor 204, 210), a chipset (i.e., chipset 205, 211), a memory (i.e., memory 206, 212), an input/output (I/O) interface (i.e., I/O 207, 213). Client 101 also includes a protected environment, e.g., trusted execution environment (TEE) 208, which may store or otherwise host one or more modules therein, such as digital rights management module (DRMM) 209 and an optional payment module (PM) 220. Server 104 may include licensing module (LM) 215 and an optional usage tracking module (UTM) 230. Hashing is used in FIG. 2 to show the optional nature of PM 220 and UTM 230. In some embodiments server 104 may also include a protected environment such as a TEE, but for the sake of clarity such a protected environment is not shown. When used, the protected environment in server 104 may host LM 215 and/or UTM 230, so as to enhance the security of operations performed by such modules.

Processors 204, 210 may be any suitable processor, including but not limited to general purpose processors and application specific integrated circuits. Such processors may be capable of executing one or multiple threads on one or multiple processor cores. Without limitation, processors 204, 210 are preferably general purpose processors, such as but not limited to the general purpose processors commercially available from INTEL® Corp., ADVANCED MICRO DEVICES®. SAMSUNG®, APPLE®, and NVIDIA®. Furthermore, while FIG. 2 illustrates client 101 and server 104 as containing a single processor, multiple processors may be used.

Chipset 205, 211 may include circuitry that is appropriate for the platform of client 101 and server 104, respectively. For example where client 101 and server 104 are a desktop computer and a server system, respectively, chipset 205 and chipset 211 may respectively include circuitry suitable for a desktop computer platform and a server system. In any case, circuitry within chipsets 205, 211 may include integrated circuit chips, such as but not limited integrated circuit chips commercially available from INTEL® Corp. Of course, other types of integrated circuit chips may also be used.

Memory 206, 212 may be any suitable type of computer readable memory. Examples of such memory include but are not limited to: semiconductor firmware memory, programmable memory, non-volatile memory, read only memory, electrically programmable memory, random access memory, flash memory (which may include, for example NAND or NOR type memory structures), magnetic disk memory, optical disk memory, combinations thereof, and the like. Additionally or alternatively, computer readable media may include other and/or later-developed types of computer-readable memory.

I/O 207 may include hardware (i.e., circuitry), software, or a combination of hardware and software that allows client 101 to communicate with one or more external devices (e.g., server 104 or a third party consumption device) in a wired or wireless manner. Likewise, I/O 213 may include hardware (i.e., circuitry), software, or a combination of hardware and software that allows server 104 to communicate with one or more external devices (e.g., client 101 or a third party consumption device) in a wired or wireless manner. Thus for example, I/Os 207, 213 may include one or more transponders, antennas, BLUETOOTH™ chips, personal area network chips, near field communication chips, combinations thereof, and the like.

Client 101 may also include one or more protected environments, which may be leveraged to protect sensitive information that may be stored on or accessed by client 101, such as but not limited to content encryption keys, content segments, private identification keys, combinations thereof, and the like. As one example of a protected environment that may be used in the client devices of the present disclosure, mention is made of memory enclave technology, such as INTEL® secure enclave technology. As may be appreciated, a memory enclave is made up of at least one memory page that has a different access policy than the access policy imposed by traditional ring boundaries of a computing system. The memory page(s) within a memory enclave may have associated read/write controls, which may be configured such that the read/write controls have exclusivity over certain operating modes or privilege "rings", system management mode or virtual machine monitors of an associated processor. In some embodiments of the present disclosure, a client device may use one or more memory enclaves to store encrypted/unencrypted content segments, diverse content, metadata associated with a content segment and/or diverse content, one or more encryption keys and/or signature keys, combinations thereof, and the like.

Another example of a protected environment that may be used in the client devices of the present disclosure is a trusted execution environment (TEE). As will be understood by those skilled in the art, a TEE is a secure environment that runs alongside an operating system and which can provide secure services to that operating system. More information regarding TEEs and the implementation thereof may be found in the TEE client application programming interface (API) specification v1.0, the TEE internal API specification v1.0, and the TEE system architecture v1.0 issued by GlobalPlatform. In some embodiments, a TEE may be provided using one or more of virtualization technology and security co-processor technology. Non-limiting examples of such technology include INTEL™ VT-x virtualization technology, INTEL™ VT-d virtualization technology, INTEL™ trusted execution technology (TXT), converged security engine (CSE) technology, converged security and manageability engine (CSME) technology, a security co-processor, manageability engine, trusted platform module, platform trust technology, ARM TRUSTZONE® technology, combinations thereof, and the like. The nature, advantages and limitations of each of these technologies are well understood, and therefore are not described herein. In some embodiments of the present disclosure, a TEE on a client device may be leveraged to execute certain operations consistent with the present disclosure, as will be described later.

The foregoing concept is illustrated in FIG. 2, which depicts client 101 as including TEE 208. It is noted that while FIG. 2 depicts an embodiment in which a TEE is used as a protected environment, it should be understood that other types of protected environments (e.g., a memory enclave) may be used as an alternative or in addition to TEE 208.

In addition to protecting sensitive information that may be accessed by client 101, the protected environment (e.g., TEE 208) may be configured to perform or otherwise support digital rights management (DRM) operations consistent with the present disclosure. In such embodiments the protected environment may include or be in the form of hardware, software, or a combination of hardware and software that is configured to enforce licensing terms that may be imposed on content segments received by client 101, e.g., from server 104 or another source (e.g., an owner of relevant source content).

For example where client 101 is a content creation device, it may receive content segments that are subject to one or more restrictions specified in a license, e.g. issued by server 104. Likewise when client 101 is a consumption device, it may receive diverse content from one or more content creation devices, wherein the diverse content contains multiple content segments that may each be governed by a separate license and corresponding license terms. In either case the protected environment of the consumption device may be relied on (e.g., by server 104 or a source content owner) to enforce the licensing terms governing one or more licensed content segments. For example, the protected environment may be trusted to prevent the consumption of one of more of the content segments in the diverse content until the licensing terms have been fulfilled (e.g., until a license has been obtained for the relevant content segment, e.g., from server 104).

DRMM 209 may be configured to enforce or cause the enforcement of license terms imposed by server 104 on a content segment (e.g., the performance of DRM operations). As shown in FIG. 2, DRMM 209 may be stored in and executed within TEE 208 or another protected environment of client 101. DRMM 209 may in some instances be in the form of computer readable instructions which when executed by a processor may cause the processor to perform digital rights management operations consistent with the present disclosure on one or more content segments to be consumed or otherwise used by client 101. Alternatively or additionally, DRMM 209 may in some embodiments be in the form of logic implemented at least in part in hardware (e.g., circuitry) to perform such digital rights management operations consistent with the present disclosure.

In various embodiments server 104 may be configured to perform content licensing operations consistent with the present disclosure. For example, server 104 may be configured to receive a content request message, determine and/or negotiate license terms for a content segment identified in the content request message, and to provision or cause the provision of the requested content segment to client 101. In this regard LM 215 may be configured to perform or cause the performance of such operations. In some embodiments, LM 215 may be in the form of computer readable instructions which when executed by a processor of server 104 cause server 104 to perform licensing operations consistent with the present disclosure. Alternatively in some embodiments LM 215 may be in the form of logic implemented at least in part in hardware to perform licensing operations consistent with the present disclosure. Further details regarding such operations are provided below.

Optional payment module (PM) 220 may be configured to provide payment (e.g., to server 104 or a payment clearing house), e.g., as may be required by DRM and/or other restrictions imposed our a content segment, e.g., by server 104 or another entity or a content owner. As will be described later such payments may be in any desired form, such as money and/or information (e.g., regarding client 101, a user thereof, usage of a relevant content segment, etc.). In this regard, payment module may be configured to issue payments (in the form of money or information) to server 104 or another clearing house, e.g., based at least in part on the use of one of more content segments by client 101. For example where license requirements specify a monetary or informational payment when certain actions are taken with a content segment (e.g., the content segment is included in diverse content or is viewed a specified number of times), payment module may operate to cause client 101 to provide the requisite payment to the appropriate entity, e.g., server 104, a payment clearing house, and/or an owner of the source content from which the content segment was derived. The operations of payment module 220 may be conditioned, for example, on usage information that may be tracked by DRMM 209 or another component of client 101 with regard to a relevant content segment.

Optional usage tracking module (UTM) 230 may be configured to obtain and/or collect usage information with regard to one or more content segments that may be licensed to client 101. Such usage information may include, for example, information regarding how a content segment is used, the location of client 101 when the content segment is consumed (e.g. viewed or used), how many times a content segment is consumed, fast forward/rewind statistics, information regarding a user of client 101 when the content segment is viewed, combinations thereof, and the like. As will be described later, UTM 230 may provide such usage information to third parties, such as the owner of the source content from which a content segment was derived. In some embodiments, UTM 230 may collect usage information in a privacy sensitive manner so as to hinder or prevent content owners from learning specific information of the users that maybe consuming certain content segments. In this regard, UTM 230 may be understood to serve as an intermediary between one or a plurality of client devices and the owners of source content corresponding to content segments that may be consumed or otherwise used on such client devices. Of course UTM 230 is shown as part of server 104 for the sake of example only, and it should be understood that it may be implemented on another device to perform usage tracking operations consistent with the present disclosure.

For the sake of clarity the present disclosure will now describe the operation of various components of system 100 in a particular use case. It should be understood that such description is illustrative only, and that the present disclosure is not limited thereto.

With the foregoing in mind in some embodiments client 101 may be configured to produce an interface (e.g., a graphical user interface) which may be configured to receive user inputs. In particular, the interface may be configured to enable a user to identify source content that is available on or through server 104, and to specify one or more content segments thereof for licensing and/or delivery. The content segment(s) may be predefined by the owner of the relevant source content or they may be specified by a user of client 101, e.g., through the interface. In the former case for example, the interface may present source content and/or predetermined content segments that are available and may be licensed through server 104, thereby enabling a user to identify and select the content segment(s) that he/she wishes to obtain. Alternatively in the latter case, the interface may enable a user to specify one or more custom content segments that he/she wishes to obtain, e.g., by the specification of a desired time frame, range of frame numbers, etc. within a piece of source content. Such information may be referred to herein as content selection information. Without limitation, in some embodiments the interface may be in the form of a secure browser or other application, which may be configured to permit users to preview source content to determine which segments thereof may be of interest.

In response to a user selection and/or specification of content selection information, client 101 may transmit a content request message to server 104. In this regard, client 101 and server 104 may be configured to communicate with one another in any suitable manner. For example, client 101 and server 104 may communicate with one another (e.g., via I/O 207 and I/O 213) using one or more communications channels established between client 101 and server 104, either directly or through network 103. In this regard network 103 may be any suitable type of network that is capable of transferring data between client 101 and server 104. For example, network 103 may be a long range communication network, short range communication network, or a combination thereof.

The phrase "short range communication network" is used herein to refer to technologies for sending/receiving data signals between devices that are relatively close to one another. Non-limiting examples of short range communication networks include but are not limited to BLUETOOTH™ networks, personal area networks (PAN), near field communication, ZigBee networks, wired Ethernet connections (e.g., local area network (LAN)), combinations thereof, and the like. In contrast, the phrase "long range communication networks" is used herein to refer to technologies for sending/receiving data signals between devices that are a significant distance away from one another. Non-limiting examples of long range communication networks include but are not limited to WiFi networks, wide area networks (WAN) including but not limited to cell phone networks (3G, 4G, etc. and the like), the internet, telephony networks, combinations thereof, and the like.

In any case client 101 may transmit a content request message to server 104, either directly or via network 103. The content request message may be configured to convey content selection information to server 104. More specifically, the content request information may specify information about one or more content segments that are being requested by a user of client 101. Such information may include, for example, the name of the source content in question, the parameters (e.g., time frame, frame range), etc. for the selected content segments thereof, user and/or client credentials (e.g., attestation information), references to characters, actors, figures, scenes, locations, colors, sounds, special effects, stunts, stunt persons, animals, cars, objects, consumer goods, combinations thereof, and the like. Moreover, in some embodiments the content request may reference or request frame/time ranges within the content that contain one or more of the foregoing elements.

Alternatively or additionally, the content request message may include information concerning the ability of client 101 to enforce DRM or other restrictions that may be imposed on a content segment, e.g., by server 104 and/or an owner of the corresponding source content. In this regard and as noted above, Client 101 may include one or more protected environments that may be configured to enforce DRM or other restrictions on content that is to be accessed by client 101. For example, client 101 may include DRMM 209, which may execute within TEE 108 and may be trusted to enforce DRM or other restrictions that may be imposed on content segments to be accessed by client 101. In such instances, client 101 may attest characteristics of TEE 108 and/or DRMM 209 to server 109, e.g. by including appropriate attestation information in a content request message or a separate attestation message. Likewise client 101 may attest to its identity to server 101 in the same or similar manner. As may be appreciated, server 104 may use such attestation information to validate whether client 101 (or, more particularly, whether DRMM 209 in TEE 208) may be trusted to enforce DRM or other restrictions on the content segment(s) that are being requested. More specifically, in some embodiments server 104 may use attestation information to verify the ability of client 101 (or, more particularly, DRMM 209 in TEE 208) to enforce an access policy over the content in question, to protect one or more encryption keys, to appropriately use an encryption key over plain text data that is protected by TEE 208, combinations thereof, and the like). Alternatively or additionally, attestation information may be used by client 101 to verify the authenticity of server 104, or vice versa. Likewise, attestation information may be used to determine whether client 101 supports certain features relevant to the content in question, e.g., a certain display resolution. Further information regarding such attestation is provided later.

The content request message may be generated, for example, in response to a user selection of a content segment for licensing. To facilitate such selection, client 101 may be configured to provide a user interface through which a user may search for content segments that are of potential interest and which may be provided by server 104. Moreover, server 104 may be configured in some embodiments to provide samples (e.g., low resolution clips, relatively short segments, etc.) of content to client 101, which may assist a user of client 101 to identify and select content segments that it wishes to license.

Regardless of how content segments are selected, the content request message may be configured to cause server 104 (or, more specifically, LM 215) to perform licensing and/or content provisioning operations consistent with the present disclosure. For example, the content request message may be configured to cause server 104 to execute an attestation protocol with client 101. As mentioned above one purpose of the attestation protocol may be to verify the authenticity of the content request message, verify the identity of client device 101, and/or to verify the ability of client 101 to enforce DRM or other restrictions that may be imposed on a content segment. Such attestation may be performed using any suitable attestation protocol, such as but not limited to direct anonymous attestation (DAA), remote anonymous attestation (RAA), enhanced privacy identifier (EPID), combinations thereof, and the like. After successful attestation (or if such attestation is not required), server device 104 may inspect the content request message to determine the content segment that is being requested by client 101. After identifying the relevant content (i.e., the content segment(s) requested by client 101), server 104 may determine licensing terms that are to be imposed on such content.

Non-limiting examples of licensing terms that may be applied to a content segment by server 104 (or, more specifically, LM 215) include payment requirements for the content segment(s), restrictions on the use and/or playback of the content segment(s), other limitations combinations thereof, and the like. Example restrictions on the use and/or playback of a content segment include but are not limited to restrictions on how many times a content segment may be viewed, a time limit over which the content segment may be viewed, limitations on fast forwarding and/or rewinding, limitations on distribution of the content segment to third parties, etc., combinations thereof, and the like. The license terms message may also specific limitations on how the content segment may be used, e.g., in diverse content (e.g., content mashups) that a user may wish to create with client 101.

The license terms applicable to one or more requested content segments may be predefined (e.g., they may be specified by an owner of the source content corresponding to the requested content segment) or they may be dynamically defined by server 104. In the former case server 104 may maintain a database of predefined licensing terms that correspond to source content as a whole or, in some instances, to predefined content segments of source content that is/are under the management of server 104. In such instances server 104 (or, more particularly, LM 215) may, in response to a content request message, inspect the content request message to identify the relevant source content and the characteristics of a content segment that is being requested.

Server 104 may then execute a lookup operation with the database to identify relevant licensing terms.

Where predefined content segments have been specified, server 104 (or, more specifically LM 215) may perform a lookup operation to identify which predefined content segment(s) correspond or encompass all or a portion of a requested content segment. In instances where a requested content segment overlaps multiple predefined content segments in the database, server 104 may select licensing terms corresponding to one or both of the predefined segments for application to the requested content segment. For example, in some instances a content request message may request a content segment that overlaps a first predefined content segment and a second predefined content segment in a database of license terms that may be used by server 104. In instances where the licensing terms for the first and second predefined content segments are the same, server 104 may select the licensing terms of either the first or the second predefined content segments for application to the requested content segment. Alternatively in instances where licensing terms defined for the first predefined subset differ from those defined for the second predefined content segment however, server 104 may evaluate the relevant licensing terms and make a determination as to which terms are to be applied to the requested content segment. For example, in some embodiments server 104 may default to more or less restrictive license terms, depending on the relevant use case, the value of the content segment, combinations thereof, and the like.

Alternatively and as noted above, server 104 may be configured to dynamically determine license terms that are to be applied to a requested content segment. In this regard, in some embodiments server 104 may be configured to determine proposed license terms using a preference database or user context sub-system, not shown, which may provide information regarding license terms that may be considered acceptable to a user of client 101. The user preference database may in some embodiments include information regarding content segments that are of "high interest" to a user of client 101. Such database may be populated in any suitable manner, such as by directly querying the user or by consulting the user context sub-system. The user context subsystem may collect contextual information that may be relevant to the determination of appropriate licensing terms for a requested content segment. Such contextual information may include, for example, previous content licenses with the user, user behavior with regard to the consumption of samples of previously unlicensed content, analytics information regarding user searches, combinations thereof, and the like. Once server 104 (or, more specifically, LM 215) determines proposed license terms for a requested content segment, it may provide such license terms to client 101 for approval. In this regard server 104 may in some embodiments transmit a licensing terms message to client 101, e.g., via a wired or wireless communications channel established over network 103. Regardless of how it is communicated, the licensing terms message is generally configured to convey the terms of a license that server 104 is willing to grant to client 101 (or a user thereof) for the content segment(s) requested in the content request message. For example and as specified above, the license terms message may specify a payment that may be required for a license to a requested content segment.

Any suitable payment may be specified in the license terms message. For example, server 104 may request a monetary payment, an informational payment, a combination thereof, and the like. As used herein, the term "informational payment" refers to a payment that is in the form of information about client 101 (e.g., location, time, sensor data etc.), a user thereof (age, income, race, address, phone number, etc.), playback information (e.g., views, fast forwards, rewinds, etc.) for one or more content segments, combinations thereof, and the like. Of course, the above are merely examples of different types of payments that may be requested in a license terms message, and other payments and payment types may be implemented as would be understood by one of ordinary skill in the art.

In some embodiments the license terms message may specify both a monetary payment and an informational payment, wherein the monetary payment may be waived if the informational payment is authorized by client 101 (or, more particularly, a user thereof). Of course the selected content segment may also be provided free of charge, in which case the license terms message may specify that a payment is not required or, alternatively, may not specify a payment for the selected content segment.

Without limitation in some embodiments server 104 (or, more specifically, LM 215) may determine the value and/or amount of payment required for a content segment based on one or more characteristics of the content segment. Non-limiting examples of such characteristics include the content of the segment, the popularity of the segment, an established monetary value of the segment, the length of the segment, combinations thereof, and the like. In some embodiments server 104 determines the value and/or amount of payment for a content segment based at least in part on the length of the content segment, either alone or relative to the total length of the corresponding source content. As may be appreciated, this may enable server 104 to set the payment value/amount to some amount less than what would be required for the source content associated with a content segment as a whole. For example, server 104 may set one or more micro payments for a content segment, which may be required when certain events occur (e.g., after a certain number of views, when a content segment is included in diverse content, etc.).

Alternatively or in addition to a payment the license terms message may specify various restrictions on a content segment. Examples of such restrictions are provided above, and are therefore not reiterated. Alternatively or in addition to such restrictions, the license terms message may specify that the content segment may be used in diverse content created by client 101, provided that licensing restrictions governing the content segment are not removed by its inclusion in the diverse content. For example where a first content segment and a second content segment are to be combined by client 101 in diverse content, the license terms message may specify that licensing terms governing the first and second content segment are to be maintained even when the first content segment is included in the diverse content. This may enable the content owner (or server 104) to retain control over the content segment, even when that segment is included in diverse content that may be consumed downstream by one or more third parties (e.g., consumption devices).

In response to receipt of a license terms message client 101 (or, more specifically, DRMM 209) may inspect the license terms message to identify the license terms specified by server 104 for one or more requested content segments. Client 101 (or, more specifically, DRMM 209) may then accept or reject the license terms based on one or more criterion.

For example, client 101 may be configured to present the license terms to a user (e.g., via a graphical user interface), and to reject or accept the license terms in response to a corresponding user input. Alternatively or additionally, client 101 may accept or decline the license terms based on a comparison of those terms to a database of acceptable license criteria, which may be maintained locally on or remotely from client 101. The database of acceptable license criteria may be populated with license terms that may be considered acceptable, e.g., by a user of client 101, and may be affiliated with a user profile corresponding to such user. For example in some embodiments the database of acceptable license criteria may specify payment (e.g., monetary, informational, or otherwise) types and/or ranges that are considered acceptable, acceptable usage restrictions that may be imposed on requested content segments, etc.

In some embodiments client 101 may accept the license terms presented in a license terms message if all or portion of such terms fall within acceptable license criteria specified in the database of acceptable license criteria. In some embodiments if a threshold number and/or percentage of the license terms in the license terms message are acceptable based on a comparison of such terms with the database of acceptable license criteria, client 101 may accept the license terms in the license terms message. Alternatively, client 101 may accept the terms falling within the bound of the acceptable criteria specified in the database of acceptable license criteria, and may present terms falling outside the database to a user (e.g., via a graphical user interface or otherwise) for verification. In such instances, acceptance or rejection of the license terms by client 101 may be conditioned on a corresponding input, e.g., from a user of client 101.

In any case client 101 may be configured to convey acceptance or rejection of the license terms to server 104 in any suitable manner. For example DRMM 209 or another component may cause client 101 to transmit a term acceptance or rejection message (as appropriate) to server 104, e.g., via a wired or wireless communication channel established between client 101 and server 104, e.g., via network 103. As may be appreciated, a term acceptance message may convey acceptance of the license terms (as well as a selected payment type, if required/appropriate), whereas a term rejection message may convey rejection of the license terms, optionally with alternative licensing terms that client 101 (or a user thereof) may find acceptable.

In the latter case (term rejection), the term rejection message may be configured to cause server 104 (or, more specifically, LM 215) to inspect the message for alternative licensing terms proposed by client 101. If such terms are found, server 104 may evaluate such terms to determine whether they are acceptable, e.g., by comparing proposed alternative terms to a database of acceptable alternative licensing terms that may be maintained locally on or remote from server 104. In some instances, server 104 may condition acceptance of certain alternative terms proposed by client 101 on acceptance of an escalation of one or more of the originally proposed license terms. For example server 104 may condition acceptance of such terms on client 101's acceptance of enhanced payment terms, such as an increase in an amount of money and/or information that is to be provided by client 101 (or a user thereof) for a license to the content under the proposed alternative terms.

As may be appreciated from the foregoing, server 104 and client 101 (or, more particularly, DRMM 209 and LM 215) may engage in a dynamic negotiation of license terms for one or more selected content segments, until license terms are agreed upon or the negotiation is terminated. In any case once licensing terms are agreed upon, server 104 may provision or cause the provision of a requested content segment in accordance with the accepted license terms. If licensing terms cannot be agreed upon, however, server 104 may decline to provide the requested content segment to client 101. Notably, in some instances the negotiation between client 101 and server 104 be completed without requiring any user input, e.g., via client 101.

As noted above, upon receipt of a term acceptance message from client 101 (or if alternative terms proposed in a term rejection message from client 101 are considered acceptable), server 104 may provision or cause the provision of a requested content segment to client 101. In some embodiments server 104 may manage and/or maintain a repository of source content, which may be local to or remote from server 104. Generally, the source content repository may store one or a plurality of pieces of source content, which may be made available for consumption and/or use by a user of client 101. In any case, a content segment may be provisioned to client 101 in any suitable manner.

For example, in some embodiments server 104 (or, more particularly, LM 215) may cause the source content to be parsed so as to isolate a requested content segment therefrom. Subsequently server 104 may encrypt the resulting isolated content segment with one or more content encryption keys (CEK(s)), using a suitable asymmetric or symmetric key encryption protocol. Non-limiting examples of suitable encryption protocols include the advanced encryption standard (AES), the Rivest Shamir Adleman (RSA) cipher, elliptic curve cryptography (ECC), combinations thereof, and the like.

Server 104 may then transmit or cause the transmission of an encrypted isolated content segment to client 101, e.g., via network 103. Simultaneously or in another communication, server 104 may transmit the CEK(s) used to encrypt the isolated content segment to client 101, e.g., via a suitable key exchange protocol. To protect such key(s) in transmission, server 104 may wrap (encrypt) the key(s) using any suitable key wrapping protocol. For example, server 104 may wrap a CEK with server 104's private key encryption key (KEK), thus producing a wrapped CEK. The wrapped CEK may then be provided to the client, e.g. using a suitable key exchange protocol. The wrapped CEK may be unwrapped (decrypted) by client device 101, e.g., using a public key corresponding to server 104's private KEK. For protection, the encryption of a CEK and/or content segments may be performed within a protected environment of server 104, such as a trusted execution environment or a memory enclave. Likewise, decryption of wrapped CEKs and encrypted content segments may be performed within a protected environment of client 101, such as within TEE 208.

Alternatively, server 104 (or, more specifically, LM 215) may be configured to divide source content into a plurality of segments, wherein at least one of the segments may correspond to the content segment requested by client 101. Server 104 may then encrypt or cause the encryption of each segment of the source content with a different CEK. For example, server 104 may divide a piece of source content into first, second and third content segments, wherein the second content segment corresponds to the content segment requested by client 101. Server 104 may then encrypt or cause the encryption of the first content segment with a first CEK, the second content segment with a second CEK, and the third content segment with a third CEK, respectively.

Server 104 may then transmit or cause the transmission of the resulting cipher text (which includes the first through third content segments) to client 101, e.g. via network 103. Server 104 may then transmit the second CEK to client 101 in accordance with an appropriate key exchange protocol. In addition, server 104 may also transmit metadata describing where the second content segment is located (e.g., begins and ends) in the cipher text provided to client 101. For protection, the second CEK and/or the metadata may be wrapped (encrypted), e.g. with a private key, such as server 104's private KEK. Consistent with the prior embodiment, the wrapped second CEK may be unwrapped (decrypted) by client device 101, e.g., using a public key corresponding to server 104's private KEK. In any case, client 101 may utilize the unwrapped content encryption keys to decrypt the encrypted content segments, so as to obtain the plain text thereof.

For the sake of clarity and ease of understanding the foregoing description has focused on a use case in which a single content segment is to be provided to client 101. It should be understood that such description is for the sake of example, and that client 101 may request and receive multiple content segments from server 104, wherein each content segment may be derived from the same or different source content. In instances where multiple content segments are to be provisioned, server 104 may provision or cause the provision of such segments in the same or similar manner as described above. In some embodiments, server 104 may encrypt each of a plurality of requested content segments with the same data encryption key(s). Alternatively, in some embodiments server 104 may encrypt each segment of a plurality of requested content segments with a different content encryption key. In either case, the cipher text of the requested content segments may be provided to client 101, e.g., via network 103. Likewise, the content encryption key(s) may be provided to client 101 via network 103, and may be wrapped (encrypted) with server 104's private KEK for protection during transmission.

Figure 3:
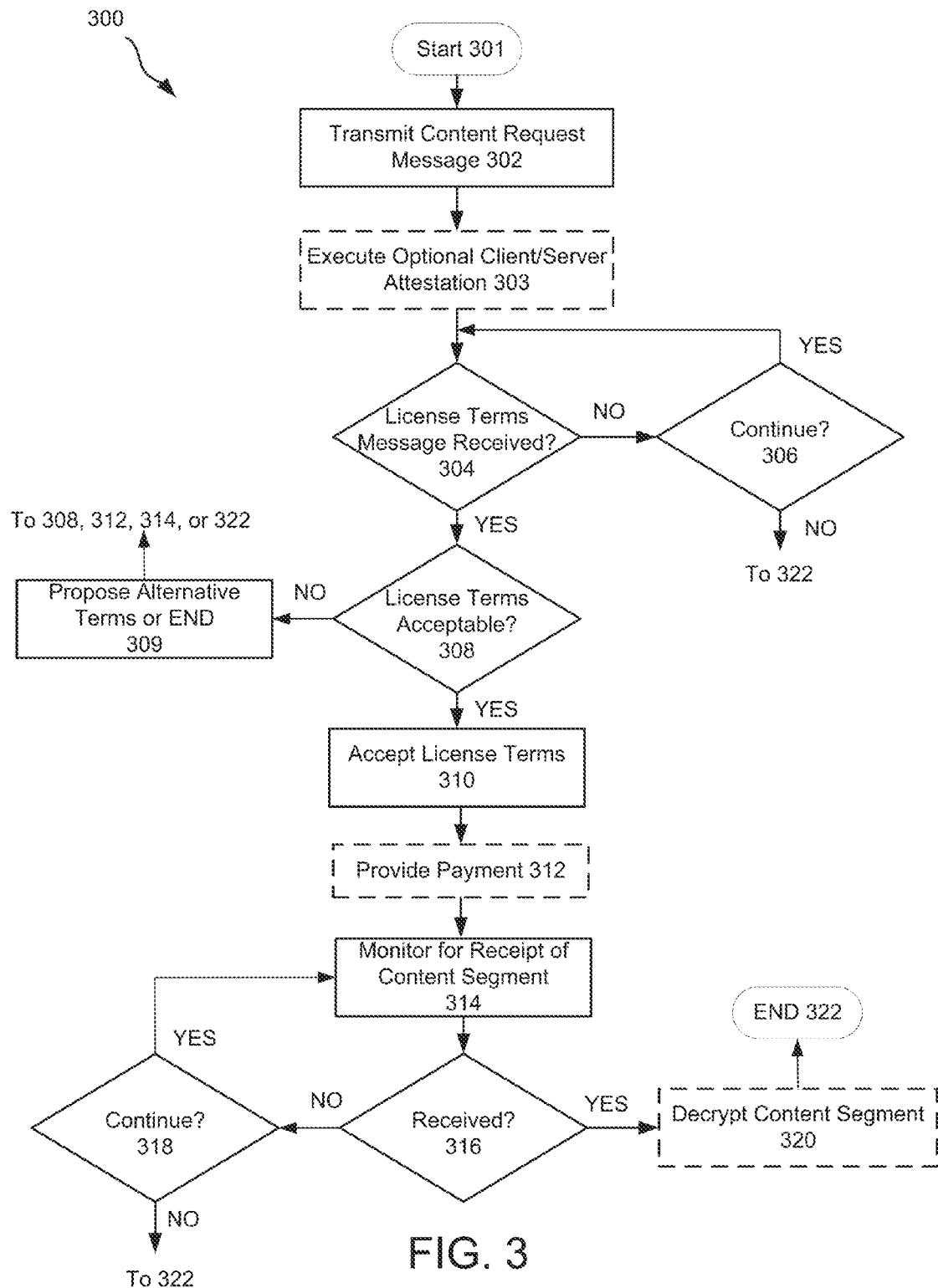
FIG. 3 is a flow diagram of example client operations that may be performed in accordance with one example of a method of selectively licensing one or more content segments consistent with the present disclosure.

Reference is now made to FIG. 3, which is a flow diagram of example operations that may be performed by a client device in accordance with a method of selectively licensing content segments consistent with the present disclosure. As many of the operations of FIG. 3 are described in detail above, they are only summarily reviewed here for the sake of brevity.

As shown, method 300 may begin at block 301. The method may then proceed to block 302, wherein client 101 may transmit a content request message to a server 104. As noted above, transmission of the content request message may be conditioned on the specification of content selection information, e.g., by a user or otherwise. In any case once the content request message has been sent the method may proceed to optional block 303, wherein client 101 may optionally attest to its identity and/or to the its ability to enforce licensing or other restrictions on content segments that may be imposed by server 104. As noted previously, attestation may be performed between client 101 and server 104 using an appropriate attestation protocol, such as direct anonymous attestation, remote anonymous attestation, or the like.

Once attestation is complete or if attestation is not required the method may proceed to block 304, wherein a determination may be made as to whether a license terms message has been received, e.g., from server 104. If not, the method may proceed to block 306, wherein a determination may be made as to whether the method is to continue. The outcome of block 306 may be conditioned on one or more predetermined criteria, such as expiration of a threshold period of time. If the method is not to continue, it may proceed to block 322 and end. If the method is to continue however, it may loop from block 306 back to block 304.

When a license terms message is received the method may proceed from block 304 to block 308, wherein a determination may be made as to whether the license terms specified therein are acceptable. If not the method may proceed to block 309, pursuant to which alternative license terms may be proposed (as discussed above), or the method may proceed to block 322 and end. If alternative terms are proposed, the manner in which the method may proceed may be conditioned on whether the server accepts the alternative or declines the alternative terms, and in the latter case whether further alternative terms are proposed. If the server accepts the alternative terms the method may proceed from block 309 to blocks 312 or 314. If the server rejects the alternative terms but does not issue further alternative terms, the method may proceed from block 309 to block 322 and end. Finally if the server rejects the alternative terms but presents new alternative terms, the method may loop back from block 309 to block 308.

If pursuant to block 308 the license terms are acceptable, the method may proceed to block 310, wherein acceptance of the license terms may be conveyed to the server as discussed above. The method may then proceed to optional block 312, wherein payment for one or more requested content segments may be provided. Of course it is not required that payment for content segments be made at the particular time shown in FIG. 3. Indeed, the present disclosure envisions methods in which payment for one or more content segments may be made at any suitable time, such as in accordance with conditions specified in license terms issued by server 104.

The method may then proceed to block 314, wherein the client device may monitor for receipt of the content segment(s) requested in the content request message. Pursuant to block 316 a determination may be made as to whether a content segment has been received. If not the method may proceed to block 318, wherein a determination may be made as to whether the method is to continue. Like block 306, the outcome of block 318 may be conditioned on one or more predetermined criteria, such as a time out. If the method is not to continue it may proceed from block 318 to block 322 and end, but if it is to continue it may loop back to block 314.

Once a content segment has been received, the method may proceed to optional block 320, wherein the client may decrypt the content segment if it has been encrypted by the server. In instances where decryption is required, for example, the client may decrypt the content encryption key(s) used to encrypt the content segment in a protected environment, and use the content encryption key to decrypt the content segment. Once decryption is performed or if decryption is not required, the method may proceed to block 322 and end.

Figure 4:
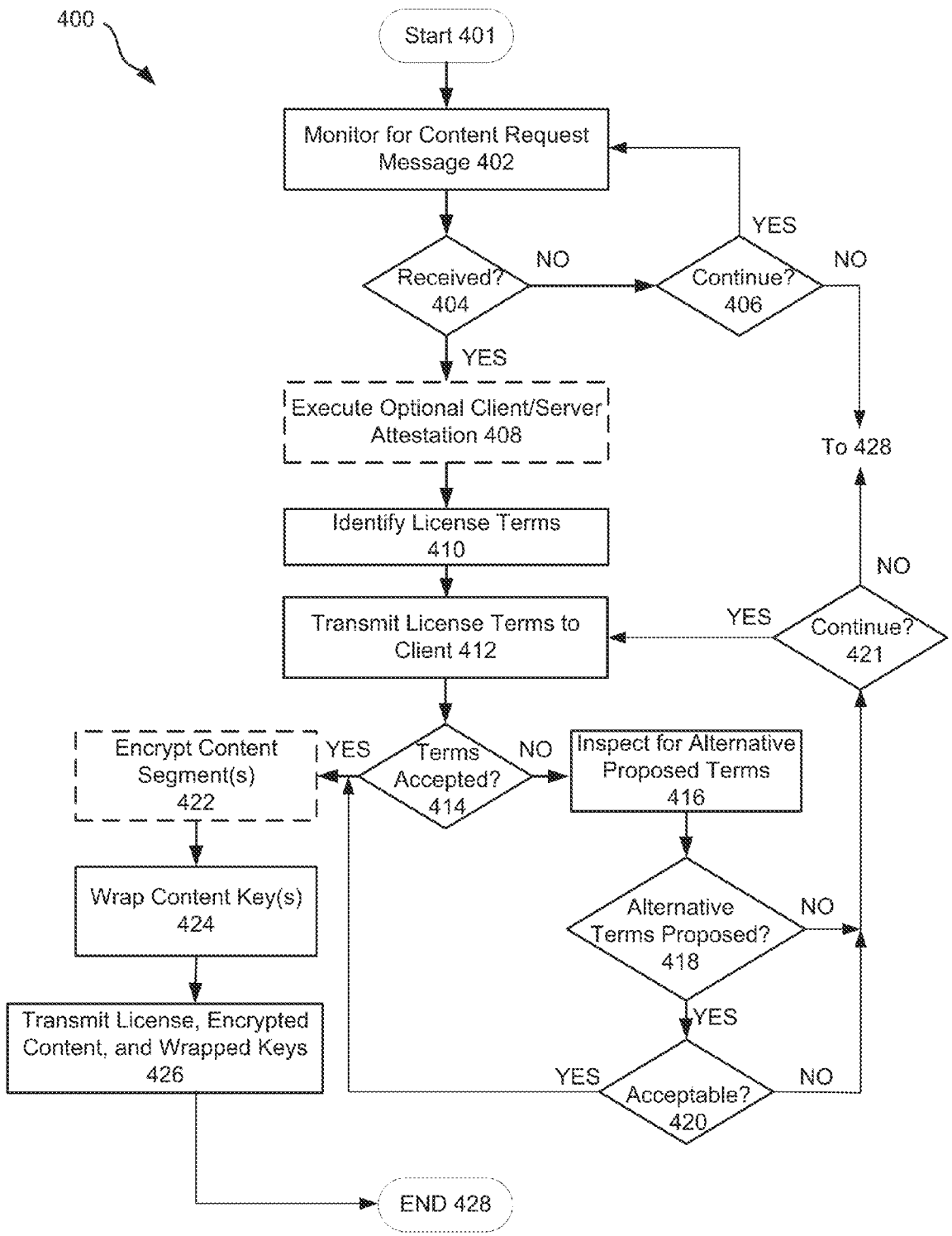
FIG. 4 is a flow diagram of example server operations that may be performed in accordance with one example of a method of selectively licensing one or more content segments consistent with the present disclosure.

Reference is now made to FIG. 4, which is a flow diagram of example server operations that may be performed in accordance with a method of selectively licensing content segments consistent with the present disclosure. As many of the operations of FIG. 4 are described in detail above, they are only summarily reviewed here for the sake of brevity.

As shown method 400 may begin a block 401. The method may then proceed to block 402, wherein the server may monitor for receipt of a content request message. Pursuant to block 404 a determination may be made as to whether a content request message has been received. If not the method may proceed to block 406, wherein a determination may be made as to whether the method is to continue. The outcome of block 406 may be conditioned on one or more predetermined criteria, such as the expiration of a threshold time period (timeout). If the method is not to continue it may proceed from block 406 to block 428 and end. If the method is to continue however, it may loop back from block 406 to block 402.

When a content request message is received the method may proceed from block 404 to optional block 408, pursuant to which the client and server may optionally perform an attestation process. As described above, the attestation process may enable the server to determine whether the client (or, more particularly, a protected environment on the client) may be trusted to enforce DRM or other restrictions that may be imposed on content segments to be provided by the server, and which may be specified in a license to such content segments.

Once attestation successfully completes (or if it is not required) the method may proceed from block 408 to block 410, pursuant to which the server may identify the relevant content segment(s) based at least in part on the content request message, and identify license terms for such segment(s), as described above. Once the license terms have been identified the method may proceed to block 412, pursuant to which the license terms for the content segment(s) may be provided to the client. As noted above, this may be accomplished by transmitting a license terms message from the server to the client. The license terms message may be configured to cause the client to evaluate the license terms to determine if they are acceptable, as described previously.

Once the license terms have been provided to the client the method may proceed to block 414, pursuant to which a determination may be made as to whether the license terms have been accepted by the client. The outcome of block 414 may be conditioned, for example, on the receipt of a terms acceptance or a terms rejection message from the client, as discussed above. If the terms are not accepted (e.g., in response to a terms rejection message) the method may proceed to block 416, pursuant to which the server may inspect a terms rejection message from the client for alternatively proposed terms, as discussed above. The method may then proceed to block 418, pursuant to which a determination may be made as to whether alternative terms have been proposed. If not the method may proceed to block 421, pursuant to which a determination may be made as to whether the method is to continue. If not, the method may proceed to block 428 and end, but if so the method may loop back to block 412. The outcome of block 421 may be conditioned on one or more factors, such as the expiration of a time-out.

If alternative terms have been proposed the method may proceed from block 418 to block 420, pursuant to which a determination may be made as to whether the alternative terms are acceptable. If not the method may proceed to block 421, pursuant to which a determination may be made as to whether the method is to continue. In this instance the outcome of block 421 may be conditioned on whether the server wishes to propose additional alternative terms. If so, the method may loop back to block 412, pursuant to which the additional alternative terms may be provided to the client. If not, however, the method may proceed from block 421 to block 428 and end.

Returning to blocks 414 and 420, if the terms proposed by the server are accepted (e.g., in response to a terms acceptance message from the client) or if it is determined pursuant to block 420 that alternative terms proposed by the client are acceptable, the method may proceed to optional block 422. Pursuant to optional block 422 the server may encrypt or cause the encryption of the requested content segment(s) with one or more content keys. The method may then proceed to block 424, wherein the server may wrap (encrypt) the content key(s) used to encrypt the content segment(s), e.g., with a private key encryption key. The method may then proceed to block 426, pursuant to which the encrypted content segment(s) and associated wrapped key(s) may be provided to the client. As may be appreciated, performance of any or all of the operations of block 422 to 426 may be conditioned in some embodiments on the receipt of a payment (monetary or otherwise) from the client. In any case, once the encrypted content and content key(s) are provide to the client, the method may proceed to block 428 and end.

Another aspect of the present disclosure relates to technologies for the production of diverse content that includes one or more licensed content segments. In such embodiments the licensed content segments may be obtained by a client device (e.g., client 101) in the manner described above or in another suitable manner. This concept is illustrated as optional box 502 of the method 500 in the example operational flow of FIG. 5. Regardless of how the licensed content segments are obtained, client 101 may be configured to produce diverse content including one or more of such content segments, i.e., to function as a content creation device. As will be described in detail below, the diverse content may be produced in such a way as to maintain DRM or other restrictions imposed on the licensed content segments included therein, and which may be imposed by server 104 or another entity (e.g., an owner of the source content from which the licensed content segment may be obtained).

Figure 5:
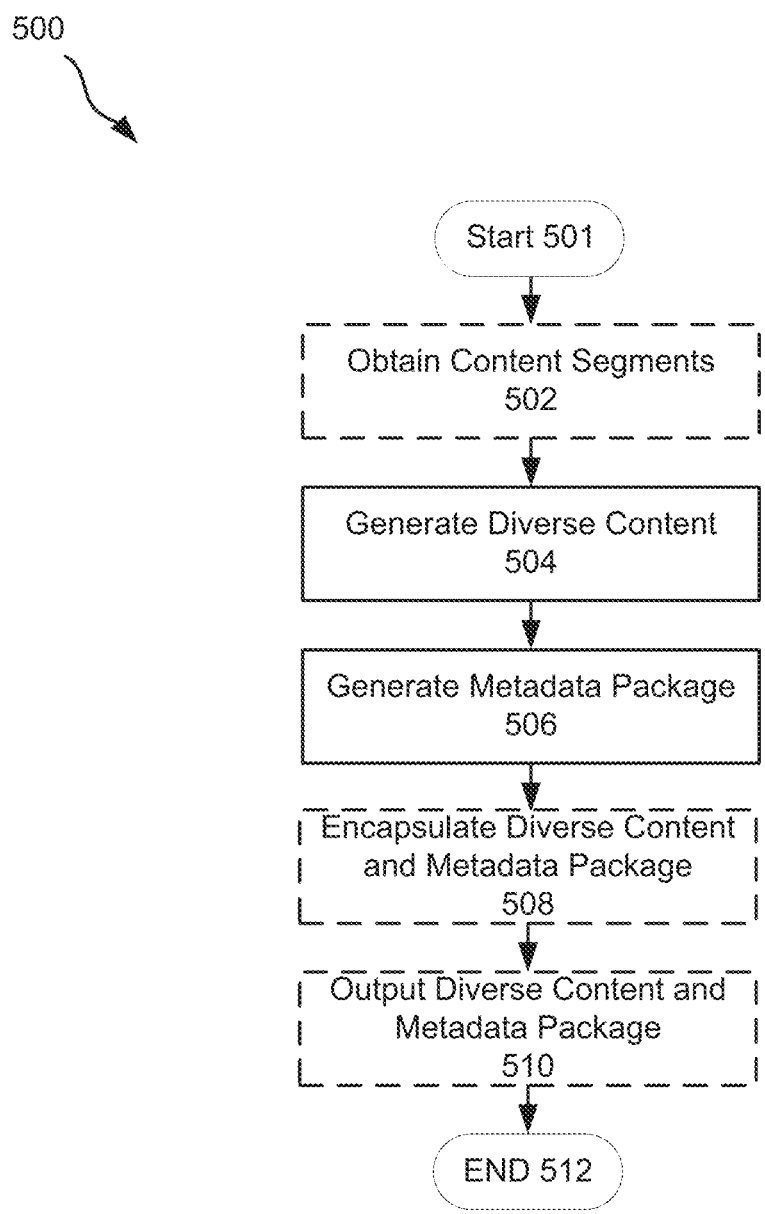
FIG. 5 is a flow diagram of example client operations that may be performed in accordance with a method of producing diverse content including one or more licensed content segments consistent with the present disclosure.

More particularly and as shown in block 504 of FIG. 5, in some embodiments client 101 may be configured to produce diverse content (e.g., content mashups) that include one or a plurality of content segments, including at least one licensed content segment. The manner in which the content segments may be combined to form the diverse content is not limited, and may be performed in any suitable manner. Without limitation, client 101 may enable a user thereof to combine content segments to form diverse content in any manner desired by the user, subject of course to any limitations that may be imposed by licensing terms imposed on the relevant content segments. In some embodiments, the content mashup may be indexed by frames or another content segmenting method, in which case one or more content keys may encrypt the content on a per segment basis.

In some embodiments client 101 (or, more particularly, DRMM 209) may be configured to cause client 101 to produce diverse content by encapsulating multiple content segments into a single data structure. In this regard reference is made to FIGS. 6 and 7, which depict one example of diverse content 601 consistent with the present disclosure. As shown in such FIGS. diverse content 601 includes first, second and third content segments (e.g., content segment A, content segment B, content segment C), though of course any number of content segments may be used. One or more of content segments A, B, and C may be licensed content segment, which may have been obtained from a server as described above, or in some other manner.

Figure 7:
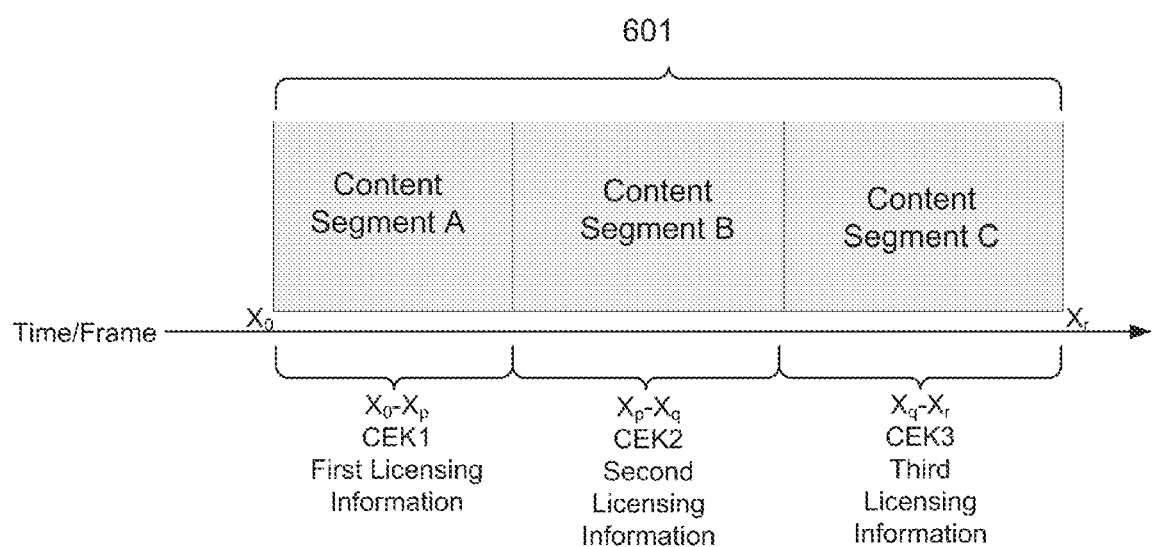
FIG. 7 is a block diagram of one example of a piece of diverse content containing multiple licensed content segments consistent with the present disclosure.

With reference to FIG. 7, in some embodiments client 101 (or, more particularly, DRMM 209) may be configured to produce or cause the production of diverse content 601 such that content segments A, B, and C are combined in a single data structure, such as a single media file. For example in instances where segments A, B, and C are each video content segments, such segments may be aligned end to end with one another in a single structure as shown in FIG. 7. Of course, such alignment is not necessary and content segments A, B, and C may be arranged in any suitable manner. For example, two or more of content segments A, B, and C may partially or completely overlap with one another. This may be particularly true in instances where content segment A is video, content segments B or C are audio that may be overlaid with content segment A.

Regardless of how the content segments in diverse content 601 are arranged, data structure 601 may be described as having a length, e.g., spanning from a first time/frame $X_0$ to an end time/frame $X_r$. With this in mind, each of content segments A, B and C may be described based on their relative position within the length of diverse content 601. This concept is illustrated in FIG. 7, which depicts an example in which content segment A is located at time/frame $X_o$-$X_p$, content segment B is located at time/frame $X_p$-$X_q$, and content segment C is located at position X-$X_r$.

One or more of the content segments included in diverse content 601 may be a licensed content segment, and therefore may be subject to DRM or other restrictions that may be specified in a license e.g., from server 104. With this in mind, client 101 (or, more particularly, DRMM 209) may be configured to encrypt or cause the encryption of each content segment included in diverse content 601 with one or more content encryption keys (CEK(s)). For protection, the CEK(s) may be stored or otherwise maintained in a protected environment of client 101, such as TEE 208 or a memory enclave. In any case, diverse content 601 may be provided from memory 206 (or another suitable location) into TEE 208. DRMM 209 may then encrypt or cause the encryption of the content segments within the diverse content with one or more content encryption keys, thereby producing encrypted diverse content. For protection, such encryption may be performed within TEE 208 or in another protected environment.

In some embodiments, DRMM 209 may cause each content segment in the diverse content to be encrypted with a different CEK. This concept is shown in FIG. 7, which depicts content segment A as being encrypted with a first CEK (CEK1), content segment B as being encrypted with a second CEK (CEK2), and content segment C as being encrypted with a third CEK (CEK3). Data structure 601 may therefore be understood to contain first encrypted content segment A, second encrypted content segment B, and third encrypted content segment C, wherein such segments may have been encrypted with the same or different CEK. Without limitation, in some embodiments licensed content segments in the diverse content may be encrypted with the same CEK that was used by server 104 to encrypt that segment, e.g., prior to transmission of the segment to client 101.

Of course each content segment need not be encrypted with a unique CEK. For example in some embodiments client 101 (or, more specifically DRMM 209) may be configured to encrypt or cause the encryption of content segments that are related in some manner (e.g., which are owned by the same content owner, which are subject to the same DRM or other restrictions, etc.) with the same CEK. Alternatively or additionally, DRMM 209 may cause overlapping content segments to be encrypted with the same CEK. In still other embodiments, DRMM 209 may cause non-overlapping portions of content segments in diverse content to be encrypted with different CEKs, and to cause overlapping portions thereof to be encrypted with the same CEK.

Returning to FIG. 5, as shown in block 506 client 101 (or, more particularly, DRMM 209) may also be configured to permit or cause the execution of metadata generation operations with resources of client 101. Such metadata generation operations may include, for example, generating a metadata package that includes one or more content labels, and optionally preparing a data structure that encapsulates both the diverse content (or encrypted diverse content) and the metadata for output, e.g., to one or more consumption devices.

In this regard DRMM 209 may cause client 101 to produce a metadata package associated with (encrypted) diverse content 601. The metadata package may include one or more content labels describing content segments within diverse content. For example, the content labels may include a description of a content segment (e.g., its identity and relationship to corresponding source content), arrangement information specifying how the various content segments in diverse content 601 are combined, location information specifying where each content segment is located within diverse content 601, combinations thereof, and the like. It is noted that the "relationship to corresponding source content" refers to a description or identification of the portions of source content to which a particular content segment pertains.

In the embodiment of FIG. 7, for example, content labels in a metadata package may provide a description of each content segment and associate that description with the location of the segment within diverse content 601. For example, the content labels may specify that content segment A corresponds to a portion of first source content, content segment A corresponds to a portion of second source content, and content segment C corresponds to a portion of third source content, wherein content segments A, B, and C are located at positions $X_0$-$X_1$, $X_p$-$X_q$, $X_q$-$X_r$, respectively of diverse content 601, where such positions refer to a specific time, frame or range of times/frames within diverse content 601.

Alternatively or in addition to the foregoing, content labels within the metadata package may specify licensing information for one or more of the content segments in diverse content 601. Non-limiting examples of licensing information include the name of the content owner, how/where a license to the content segment may be obtained, the name of the content segment, where a content segment is located within a content mashup (frame, time, etc.), combinations thereof, and the like. In some embodiments, licensing information may include a pointer to server 104 or another licensing source. In such instances the pointer may be configured to cause a consumption device to obtain or attempt to obtain a license for a corresponding content segment, e.g., from server 104 or another entity. Without limitation, in some embodiments the pointer is configured such that a consumption device may at least initiate the acquisition of a license without the involvement of a user (e.g., without a requiring a user input).

Content labels within the metadata package may also include or be in the form of a tag, wherein the tag may include and/or preserve information about the content segment(s) in question. Such tags may, for example, be in the form of a hash of the relevant content segments. In some instances, a tag may be indexed to a corresponding piece of content and stored (e.g., on data tracks available using popular content encoding schemes). In those and other instances the tags may serve as provenance/history of mashup content and may be used to divide and/or distribute collected licensing fees. In some instances content labels may index tags in a data track so as to provide a reference to additional (e.g., pre-mashup) content. Tags may also reference post mashup content (e.g., frames) and include content owner and/or license owner application program interfaces.

In the embodiment of FIG. 7 for example, DRMM 209 may generate a metadata package for diverse content 601 that includes one or more content labels that associate first licensing information with content segment A, second licensing information with content segment B, and third licensing information with content segment C. Of course, separate licensing information need not be provided for each content segment in diverse content. For example in instances where diverse content includes content segments that are owned by the same owner and/or which are subject to the same licensing requirements, DRMM 209 may cause the production of a metadata package that includes a single content label that provides licensing information for those content segments.

The metadata package may be generated prior to, simultaneously with, or subsequent to the creation of diverse content diverse content 601. Without limitation, in some embodiment the metadata package is generated simultaneously with or near-in-time to the creation of the diverse content. As used herein, the term "near-in-time" when used in the context of metadata generation means within a reasonable time period following the creation of diverse content 601, e.g., which may range from one or more seconds, minutes, hours, or even days, depending on the circumstances. Without limitation, in some embodiments a metadata package describing diverse content 601 is generated simultaneously with the creation of diverse content.

Figure 6:
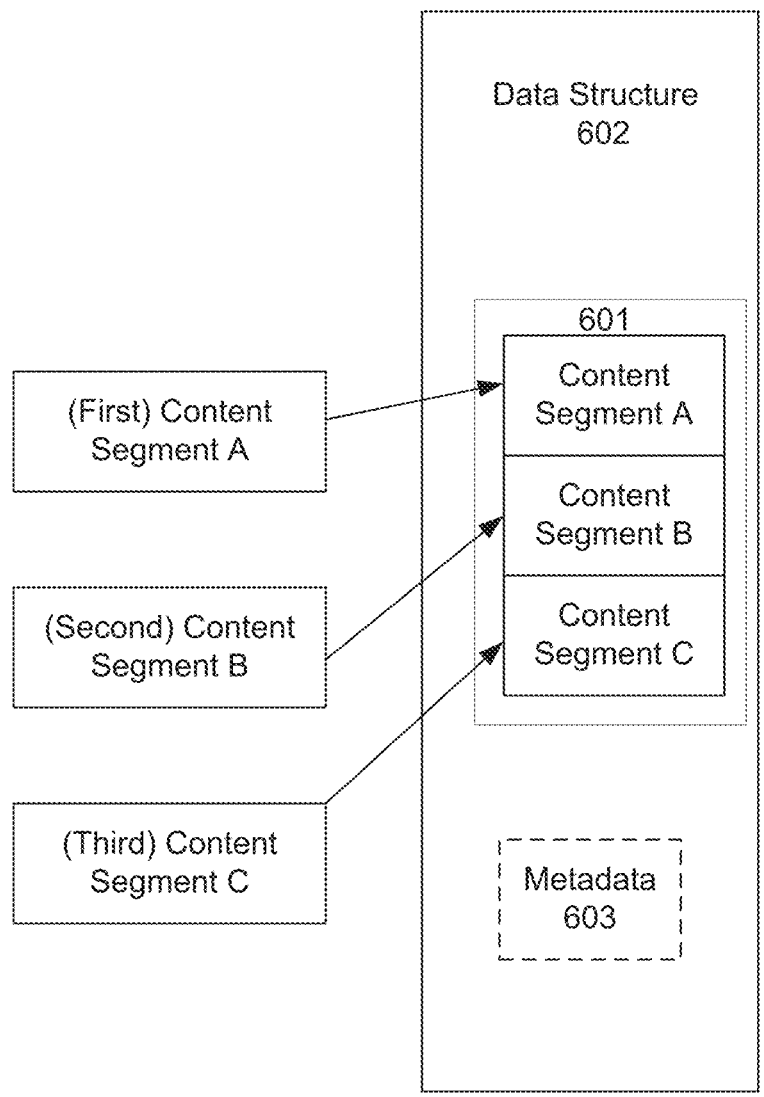
FIG. 6 is a block diagram illustrating the creation of a data structure that encapsulates diverse content and optionally an associated metadata package, consistent with embodiments of the present disclosure

When diverse content 601 is to be distributed to third parties (e.g., consumption devices), DRMM 209 when executed may cause client 101 to package encrypted diverse content and a corresponding metadata package for output. In some embodiments, DRMM 209 when executed causes client 101 to produce a data structure 602 that encapsulates the encrypted diverse content and optionally its associated metadata package. This concept is illustrated in FIG. 6, which depicts the production of a data structure 602 that includes (encrypted) diverse content 601 and optionally metadata package 603. Alternatively in some embodiments metadata package 603 and diverse content 601 may be transmitted separately to a consumption device, in which case packaging diverse content 601 into data structure 602 may not be necessary.

As may be appreciated from the foregoing, client 101 can produce diverse content that contain one or multiple contents segments, wherein each content segment in the diverse may be subject to the same or different DRM or other restrictions. Moreover and as will be described below, the restrictions on the different content segments may be maintained, even when the diverse content is transmitted to a consumption device.

For the sake of example, the present disclosure will now describe a use case in which client 101 is a consumption device that may be used to consume diverse content consistent with the present disclosure. In this use case, the consumption device may include the same components as shown in client 101 of FIG. 2. The nature of such components is therefore not reiterated. Rather, the focus of the discussion herein will be on content consumption operations that may be performed by client 101 when it acts as a consumption device, e.g., in response to the reception of encrypted diverse content and an associated metadata package. The described use case also focuses on a situation in which the consumption device is not the same as the content creation device that created the diverse content, and where the diverse content includes at least one licensed content segment that is subject to DRM or other restrictions and therefore may require a license before it may be consumed.

Figure 8:
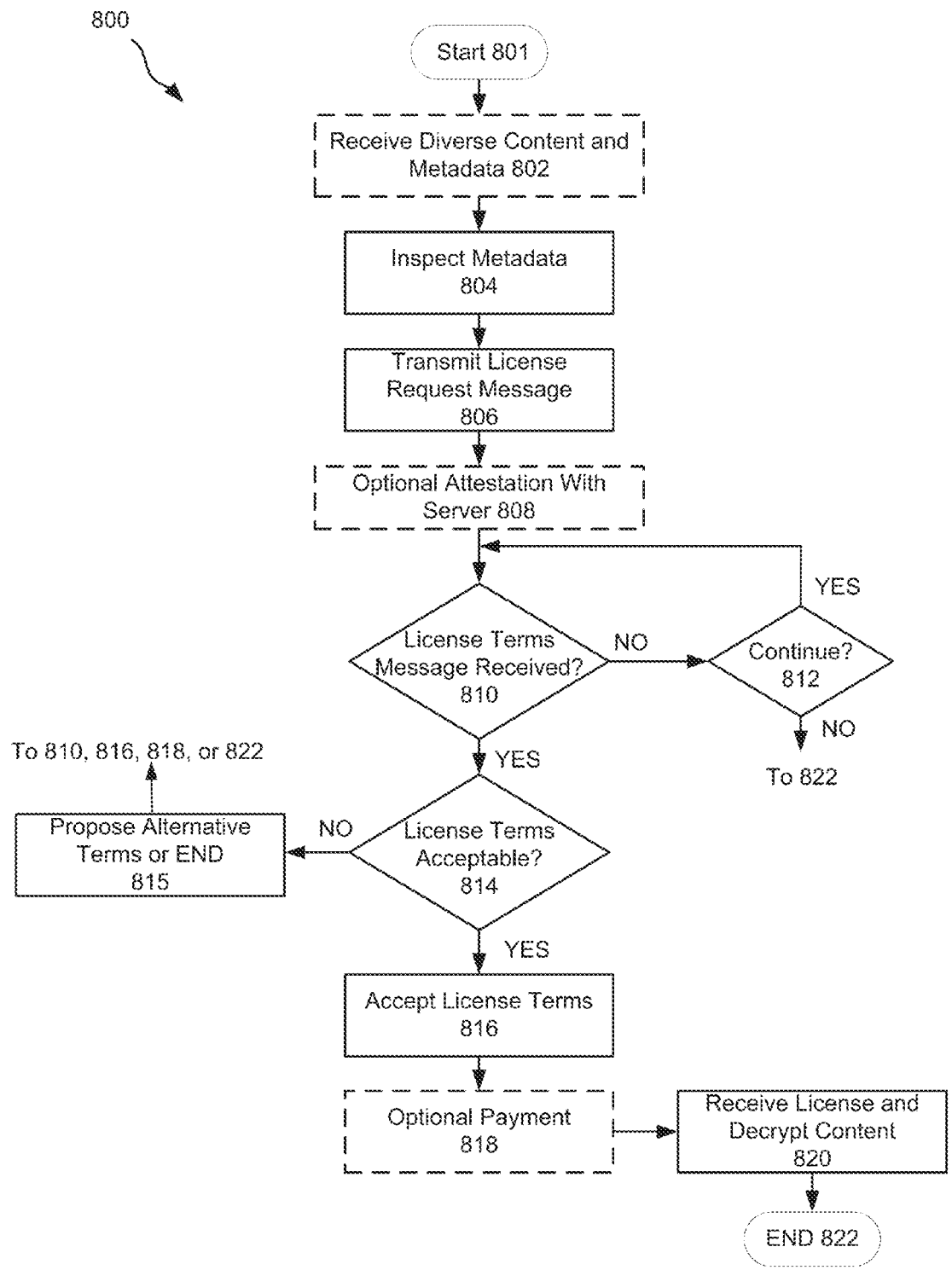
FIG. 8 is a flow diagram of example operations of a consumption device that may be performed in accordance with a method of consuming diverse content, consistent with the present disclosure.

In this regard reference is made to FIG. 8, which is a flow diagram illustrating example operations that may be performed in accordance with a content consumption method consistent with the present disclosure. As shown, method 800 may begin at block 801. The method may then proceed to optional block 802, wherein a consumption device may optionally receive (encrypted) diverse content containing one or more licensed content segments and an associated metadata package. It should be understood that the diverse content and metadata package may be transmitted over a wired or wireless communication channel, e.g., directly or via network 103, using any suitable wired or wireless communication protocol. In instances where the consumption device produced the diverse content and metadata or where the diverse content and metadata are already present on the consumption device, block 802 may be omitted.

In any case the method may proceed to block 804, pursuant to which the consumption device (or, more specifically, a DRMM thereof) may inspect the metadata package for content labels describing the licensing requirements, if any for the content segments included in the encrypted diverse content. For protection and ensure enforcement of any required licensing requirements, the metadata package may be stored and inspected within a protected environment (e.g., TEE 208). For example, DRMM 209 when executed may decrypt (if necessary) the metadata package within TEE 208, thereby exposing the plain text of any content labels therein. DRMM 209 may then analyze the content labels to identify the content segments in the encrypted diverse content, as well as any licensing requirements associated with those content segments. In particular, DRMM 209 may look for pointers that are associated with content segments, and which indicate how and/or where the consumption device may obtain a license for the relevant content segment.

Pursuant to block 806 of FIG. 8, when a DRMM identifies a pointer in a content label that designates a content server (e.g., server 104) as a source of content licenses for an associated content segment, the DRMM may cause the consumption device to transmit a license request message to that server. In general, the license request message may be configured to cause the content server to perform many of the same functions as the content request messages described above, except inasmuch as they may only seek to acquire a license to a content segment. The nature and configuration of the license request message may therefore be quite similar to that of the content request messages described previously, except insofar as they need not include a request for the content server to provision the associated content. For example, the license request message may include information regarding the content segment in question, such as the source content corresponding to the content segment, the portion of the source content to which the content segment pertains, combinations thereof, and the like. The DRMM of the consumption device may populate license request message with such information, e.g., based on the information in content labels received with a metadata package.

Of course it should be understood that license requests need not be transmitted from a consumption device to a content provider such as a content server. Indeed, the present disclosure envisions embodiments wherein one or more third party services may issue license requests for one or more content segments, e.g., on behalf of consumption devices such as client 101. For example, a social media serve may monitor social media behaviors and proactively seek a license for targeted content segments. In such instances the social media provider may negotiate with the user of the consumption device directly to create a license, or may employ user profile information to obtain a license for the content on the user's behalf, independently or with the user's involvement. The license request message may be configured to cause the content server to perform licensing operations consistent with those described above in connection with FIG. 4, except insofar as blocks 422 and 424 may be omitted and the operations of block 426 may be limited to the provision of a license to the consumption device. With this in mind and returning to FIG. 8, after transmitting the license request message to the server, pursuant to optional block 808 the consumption device may attest to its ability to enforce DRM and/or other restrictions that may be imposed on the content segment in question. Specifically, the consumption device may attest to the capabilities of it protected environment (in this case TEE 208 and/or DRMM 209), using any suitable attestation protocol. Suitable attestation protocols have been described above in connection with FIG. 2 and therefore are not reiterated here.

If attestation succeeds or if attestation is not required, the method may proceed to block 810, pursuant to which a determination may be made as to whether a license terms message has been received, e.g., from the server. More specifically, a DRMM of the consumption device when executed may cause the consumption device to monitor for the receipt of a license terms message from a relevant server. If such a message has not been received, the method may proceed to block 812, pursuant to which a determination may be made as to whether the method is to continue. The outcome of block 812 may be conditioned on one or more predetermined criteria, such as the expiration of a threshold period of time. If the method is not to continue it may proceed from block 812 to block 822 and end. If the method is to continue, however, it may loop back to block 810 from block 812.

When a license terms message has been received, the method may proceed to block 814. Pursuant to block 814, a DRMM or another component of the consumption device may determine whether the license terms are acceptable. The manner in which the DRMM may determine whether the license terms are acceptable is the same as described above in connection with the evaluation of license terms performed by client 101 (or, more specifically, DRMM 209), and therefor is not described again. If the consumption device determines that the license terms are not acceptable, the method may proceed to block 815, wherein the consumption device may propose alternative license terms to the server or the method may end.

In instances where alternative license terms are to be proposed, the consumption device may transmit a message including those alternative terms to the server. The manner in which the method may proceed thereafter may be conditioned on subsequent actions taken by the server. For example if the server rejects the alternative license terms the method may proceed to block 810, wherein the consumption device may monitor for the receipt of a new license terms message. Alternatively if the server accepts the alternative terms, the method may proceed to one or more of blocks 816, 818, or 820, the operations of which are described below.

When it is determined pursuant to block 814 that license terms are acceptable (or in instances where a server has accepted alternative terms proposed, e.g., pursuant to block 815), the method may proceed to block 816. Pursuant to such block the consumption device may accept the license terms, e.g., by transmitting a term acceptance message to the server. The method may then proceed to optional block 818, pursuant to which the consumption device may provide a payment (if necessary) for the license to the licensed content segments in the diverse content in question. In alternative embodiments, payment may be provided after the license is received from the server, e.g., in accordance with payment requirements specified in the license.

Once payment is made (or if payment is not required) the method may proceed to block 820, pursuant to which the consumption device may receive a license for the content segment in question. The license may be received, for example, in a license message from the relevant content server. In response to receipt of the license message, the consumption device (or a DRMM thereof) may cause the license to be provided to a protected environment therein, such as TEE 208. Upon determining that a license has been received for a content segment, the DRMM may permit decryption of the corresponding content segment in the diverse content, e.g., within a protected environment such as TEE 208 or in another location. In this regard, the consumption device may obtain one or more content encryption keys (CEKs) from the content provider, such as server 104 or a mashup service, as previously described. Thus for example, where the content provider is a content creation device as noted above, the consumption device may acquire one or more CEKs from the content creation device. Likewise, the consumption device may acquire one or more CEKs from a content server as discussed above. In some embodiments, the consumption device may acquire a first CEK for a first content segment from a content creation device, and a second CEK for a second content segment from a content server.

In any case, a CEK may be provided from the content provider to the consumption device using traditional key exchange mechanisms such as high definition content protection (HDCP). In instances where multiple CEKs are used (e.g., where different CEKs encrypt different content segments), the key exchange process may involve a transfer of all of the relevant CEKS for the licensed content segments. Of course and as noted above, different content segments may be provided from different content providers, in which case each content provider may provide one or more CEKs for the content segment(s) it is provisioning to a consumption device. In this way, the consumption device may decrypt all content segments from diverse content providers and mash the resulting plain text of such segments together in any desired manner.

In any case, the DRMM may enforce the restrictions imposed by the license on the relevant content segment. For example, the DRMM may monitor usage of the content segment and enforce restrictions thereon that are imposed by a corresponding license. This process may be reiterated for each licensed content segment in diverse content that is to be consumed by a consumption device. As may be appreciated, a DRMM may prevent a consumption device from decrypting and/or using a content segment in the diverse content until a license thereto has been obtained. This may effectively prevent consumption of licensed content segments in the diverse content until the required license has been received.

The consumption device may also be configured to enforce payment requirements specified by a license to a content segment. For example and as noted above, a license to a content segment may require a consumption device to provide a monetary and/or informational payment to the license server or a separate payment clearing house, e.g., based at least in part on the use of the content segment. In some embodiments, a license may specify that a monetary or informational payment is required when a content segment is viewed a specified number of times, when a content segment is distributed to a third party, when a content segment is included in diverse content, etc., combinations thereof, and the like. In any case, one or more modules of the consumption device (e.g., a DRMM or a separate payment module) may be configured to monitor the use of content segments by a consumption device, and to cause the consumption device to issue payments for such use as described above. In instances where a content segment or diverse content including the content segment is the product of multiple content owners, the consumption device (or a module thereof) may be configured to apportion a payment specified in a license among the various content owners, either directly or via a payment clearing house (which, in some instances, may be a server such as server 104).

In instances where a license to a content segment specifies the provision of an informational payment (such as those discussed above), the consumption device (or a module thereof) may be configured to collect such information in the form of metadata and to provide that metadata to the content owner, a relevant server (e.g., server 104), a payment clearing house, or a combination thereof. In any case, for privacy and other considerations the t consumption device (or a module thereof) may collect such information as metadata within a protected environment (e.g., TEE 208). In some instances, the metadata may be earmarked for provision to one or more payment clearing houses and/or content owners, e.g., which may be specified in a license to content segments within the diverse content.

Moreover to protect the metadata during transit, the consumption device (or a module thereof) may encrypt the metadata within the protected environment prior to its transmission. Encryption of the metadata in some embodiments may be performed using traditional ciphers such as AES, RSA, ECC. Alternatively or additionally, encryption may be performed using homomorphic encryption in order to protect the privacy of the users consuming the diverse content. In the latter case, a server or payment clearing house may provide one or more public additive homomorphic encryption keys (PAHEK) to various consumption devices. In some instances the PAHEK may be issued by a licensing server (e.g., server 104) when a license to a content segment is issued. In any case, the PAHEK(s) may be used to encrypt metadata collected by a consumption device with regard to one or more content segments. In some instances, a unique PAHEK may be issued for each content segment in a piece of diverse content. Alternatively or additionally, multiple instances of the same PAHEK may be used to encrypt each content segment in a piece of diverse content.

For example, license terms governing one or more content segments may permit the gathering of information (e.g., by DRMM 209 or another component such as optional UTM 230) regarding the use of the content in question, e.g., by a consumption device such as client 101. Such information may include, for example, the number of times a content segment is played, rewound, fast forwarded, etc. Alternatively or additionally, such information may include user context (e.g., the location of the user, identity of the user, etc., when a content segment is consumed. In the latter case, such user context may be obtained from one or more sensors (not shown) which may be integral with or coupled to the consumption device or another device. Such information may be monitored by DRMM 209 or another component both before and after a license is issued, as well as during and after a content segment is consumed. In some instances such monitoring may include establishing a correlation between content consumption behavior and increased/decreased preference for consumption of other media and non-media products.

In any case, user behavior and/or the use of licensed content can be enumerated in a table of enumerated behaviors that includes an enumeration-value (EV) and a counter-value (CV). As the client 101 (or, more specifically, DRMM 209) monitors such behavior, it may tally (increment) the CV for each observed EV. In any case, when a PAHEK is supplied to client device 101, it may be used to encrypt the CV tally before it is transmitted to a third party entity, such as server 104 (or, more specifically, UTM 230), another client 101, or a payment clearing house (not shown).

In some instances the observed EV count is encrypted using a PAHEK and is then 'added' to a first encrypted CV tally. For example, ECV'=ECV+{CV}PAHEK where CV is the user's current tally and ECV is the encrypted tally obtained elsewhere (e.g., from another client device). The resultant ECV' may then contain the tally from the current user as well as the tallies from other users. As each ECV is encrypted, privacy sensitive information of a first user is not disclosed to a second user of the device, and vice versa. Moreover since ECV' contains only the result of the addition operation, the content provider/license server (e.g., server 104 or, more specifically, UTM 230) may be unable to assign a specific tally to a particular user. However, the content provider/license server may utilize the tally obtain analytics that can assist in identifying popular and unpopular content frames. In this way, information regarding the usage/consumption of the use of content in a content mashup may be obtained and provided to a license/content server or another entity in a privacy sensitive manner.

As may be appreciated, greater privacy protection (and in some cases, analytics value) may be obtained as the number of users (i.e. consumers of a content segment) increases. In this regard, peer to peer (e.g., MESH) routing or another method may be used to provide an EV count and CV of one user (e.g., one client device) to another.

As noted above, the EV and/or CV for each user may be encrypted with a first instance of the PAHEK and added to previously received information of another user to result in ECV', which may be transmitted from one client to another. Routing of ECV' may involve the issuance of a message that includes a message ID and node history, as well as ECV'. A receiving node (client device) may inspect the message to determine whether it has received that ECV' before. If not, the receiving node may append its EV and CV information (encrypted with another (e.g., second) instance of the PAHEK) to form a new ECV', which can then be routed to another client device. Once ECV' has been transmitted to a threshold number of nodes (e.g., all or some portion of the nodes), it may be relayed to server 104 (or another entity such as a content owner, license owner, etc.), which may use a private additive homomorphic encryption key to decrypt the ECV and obtain the EV and CV information for each user therein.

Because the EV and CV of each user is encrypted with the PAHEK, the EV and CV of any particular owner remains opaque to the devices participating in the reporting. The framework may also be configured to eliminate duplicates (e.g., based on message ID or another mechanism). Moreover, all nodes (client devices) may participate even if their user has not viewed the content segment(s) in question or if the node does not have the capability to monitor user behavior.

EXAMPLES

The following examples pertain to further embodiments and comprise subject material such as a system, a device, a method, a computer readable storage medium storing instructions that when executed cause a machine to perform acts based on the method, and/or means for performing acts based on the method, as provided below.

Example 1

According to this example there is provided a client device for selectively licensing content segments, including a processor, a memory, and a digital rights management module, wherein: the client device is configured to receive at least one licensed content segment and a license for the at least one licensed content segment from a server device, the at least one licensed content segment being a portion of corresponding source content that is available for license through the server device, the license imposing one or more restrictions on the at least one licensed content segment; and the digital rights management module is configured to enforce the restrictions on the at least one licensed content segment.

Example 2

This example includes any or all of the features of example 1, wherein the digital rights management module is further configured to cause the client device to request a license for the at least one licensed content segment from the server device.

Example 3

This example includes any or all of the features of example 2, wherein the digital rights management module is configured to cause the client device to request the license at least in part by causing the client device to transmit a content request message to the server device, the content request message identifying a requested content segment of a corresponding piece of source content that is available for license through the server device, the requested content segment corresponding to the licensed content segment.

Example 4

This example includes any or all of the features of any one of examples 1 to 3, wherein the client device further includes a protected environment, and the digital rights management module is maintained within the protected environment.

Example 5

This example includes any or all of the features of example 4, wherein the protected environment is a trusted execution environment.

Example 6

This example includes any or all of the features of any one of examples 1 to 5, wherein the client device is further configured to provide a user interface, wherein the user interface is configured to: present previews of one or more pieces of source content that are available for license through the server device; and cause the generation of the content request message based at least in part on one or more received inputs.

Example 7

This example includes any or all of the features of example 3, wherein the content request message includes content selection information, the content selection information being selected from the group consisting of a name of the source content corresponding to the requested content segment, a time frame for the requested content segment, a frame range for the requested content segment, references to one or more characters, actors, figures, scene, locations, colors, sounds, special effects, stunts, stunt persons, animals, or objects, or one or more combinations thereof.

Example 8

This example includes any or all of the features of example 7, wherein the content selection information includes a frame range for the requested content segment, a time frame for the requested content segment, or a combination thereof.

Example 9

This example includes any or all of the features of example 3, wherein: the license includes license terms governing the use of the licensed content segment; and the digital rights management module is further configured to enforce the license terms.

Example 10

This example includes any or all of the features of example 9, wherein the content request message is configured to cause the server device to determine the license terms, and to transmit a license terms message containing the license terms to the client device.

Example 11

This example includes any or all of the features of example 10, wherein the content request message is configured to cause the server device to determine the license terms at least in part by selecting one or more predetermined license terms from a licensing database maintained locally or remotely from the server device.

Example 12

This example includes any or all of the features of example 10, wherein: the server device is authorized to license a plurality of predefined content segments; and the content request message is configured to cause the server device to determine the license terms at least in part by determining which of the plurality of predetermined content segments corresponds to the requested content segment, and selecting one or more predetermined license terms associated with a predetermined content segment that corresponds to the requested content segment.

Example 13

This example includes any or all of the features of example 10, wherein the content request message is configured to cause the server device to dynamically determine the license terms.

Example 14

This example includes any or all of the features of example 13, wherein the content request message is configured to cause the server device to dynamically determine the license terms at least in part by negotiating the license terms with the client device.

Example 15

This example includes any or all of the features of example 14, wherein the content request message is configured to enable the server device to negotiate the license terms with the client device independent of an input from a user of the client device.

Example 16

This example includes any or all of the features of example 13, wherein the server device is to dynamically determine the license terms based at least in part on contextual information of a user of the client device.

Example 17

This example includes any or all of the features of example 10, wherein the license terms specify a payment for a license to the requested content segment.

Example 18

This example includes any or all of the features of example 17, wherein the payment is selected from the group consisting of a monetary payment, an informational payment, or a combination thereof.

Example 19

This example includes any or all of the features of example 10, wherein in response to the license terms message, the digital rights management module is configured to: inspect the license terms message to identify the license terms specified by the server device; and accept or reject the license terms.

Example 20

This example includes any or all of the features of example 19, wherein the digital rights management module is configured to accept or reject the license terms based at least in part on a user input.

Example 21

This example includes any or all of the features of example 19, wherein the digital rights management module is configured to: compare the license terms to a database of acceptable license criteria maintained locally on or remote from the client device; and accept or reject the license terms based at least in part on the comparison of the license terms to the database of acceptable license criteria.

Example 22

This example includes any or all of the features of example 19, wherein the client device is further configured to transmit a term acceptance message to the server device when the license terms are accepted, and to transmit a term rejection message to the server device when the license terms are rejected.

Example 23

This example includes any or all of the features of example 22, wherein the term rejection message includes alternative licensing terms for the requested content segment.

Example 24

This example includes any or all of the features of example 22, wherein the term acceptance message is configured to cause the server device to cause the transmission of the requested content segment and a license to the requested content segment to the client device, the requested content segment corresponding to the licensed content segment.

Example 25

This example includes any or all of the features of example 24, wherein:
the requested content segment is a portion of source content available for license via the server device; and the term acceptance message is configured to cause the server device to isolate the requested content segment from the source content.

Example 26

This example includes any or all of the features of example 24, wherein the term acceptance message is further configured to cause the server device to encrypt the requested content segment with a content encryption key to produce encrypted content, and to provide the content encryption key and the encrypted content to the client device.

Example 27

This example includes any or all of the features of example 24, wherein the term acceptance message is configured to cause the server device to: divide the source content into a plurality of segments, wherein one of the plurality of segments corresponds to the requested content segment; encrypt the segment corresponding to the requested content segment with a first content encryption key, and segments other than the segment corresponding to the requested content segment with at least one other content encryption key, thereby producing encrypted content; transmit the encrypted content to the client device; and transmit the first content encryption key to the client device.

Example 28

This example includes any or all of the features of example 27, wherein the term acceptance message is further configured to cause the server device to transmit metadata to the client device, the metadata describing where the segment corresponding to the requested content segment is located in the encrypted content.

Example 29

This example includes any or all of the features of example 26, wherein in response to receipt of the encrypted content, the client device is configured to decrypt the encrypted content so as to obtain the licensed content segment.

Example 30

According to this example there is provided a server device for selectively licensing content segments, including a processor, a memory, and a licensing module, wherein: in response to a content request message from a client device identifying a requested content segment, the licensing module is configured to cause the server device to determine license terms for a license to the requested content segment and transmit a license terms message containing the license terms to the client device; wherein the requested content segment is a portion of a corresponding piece of source content that is available for license through the server device.

Example 31

This example includes any or all of the features of example 30, wherein the licensing module is further to cause the server device to determine the license terms at least in part by selecting one or more predetermined license terms from a database of licensing terms maintained locally on or remote from the server device.

Example 32

This example includes any or all of the features of any one or examples 30 and 31, wherein: the server device is authorized to license a plurality of predefined content segments; and the licensing module is further to cause the server device to determine the license terms for the requested content segment at least in part by determining which of the plurality of predetermining content segments correspond to the requested content segment, and selecting one or more predetermined license terms associated with a predetermined content segment that corresponds to the requested content segment.

Example 33

This example includes any or all of the features of any one of examples 30 to 32, wherein the licensing module is further to cause the server device to dynamically determine the license terms.

Example 34

This example includes any or all of the features of example 33, wherein the server device is to dynamically determine the license terms at least in part by negotiating the license terms with the client device.

Example 35

This example includes any or all of the features of example 34, wherein the server device is to negotiate the license terms with the client device independent of an input from a user of the client device.

Example 36

This example includes any or all of the features of example 33, wherein the server device is to dynamically determine the license terms based at least in part on contextual information of a user of the client device.

Example 37

This example includes any or all of the features of any one of examples 30 to 36, wherein the license terms specify a payment for a license to the requested content segment.

Example 38

This example includes any or all of the features of example 37, wherein the payment is selected from the group consisting of a monetary payment, an information payment, or a combination thereof.

Example 39

This example includes any or all of the features of any one of examples 30 to 39, wherein the license terms message is configured to cause the client device to: inspect the license terms message to identify the license terms specified by the server device; and accept or reject the license terms by transmitting a term acceptance or a term rejection message to the server device, respectively.

Example 40

This example includes any or all of the features of example 39, wherein in response to the term acceptance message, the licensing module is configured to cause the server device to transmit the requested content segment and a license to the requested content segment to the client device.

Example 41

This example includes any or all of the features of example 40, wherein in response to the term acceptance message, the licensing module is configured to cause the server device to isolate the requested content segment from the source content prior to transmitting the requested content segment to the client device.

Example 42

This example includes any or all of the features of example 40, wherein in response to the term acceptance message, the licensing module is configured to cause the server device to encrypt the requested content segment with a content encryption key to produce encrypted content, and to provide the content encryption key and the encrypted content to the client device.

Example 43

This example includes any or all of the features of example 40, wherein in response to the term acceptance message, the licensing module is configured to cause the server device to: divide the source content into a plurality of segments, wherein one of the plurality of segments corresponds to the requested content segment; encrypt the segment corresponding to the requested content segment with a first content encryption key, and segments other than the segment corresponding to the requested content segment with at least one other content encryption key, thereby producing encrypted content; transmit the encrypted content to the client device; and transmit the first content encryption key to the client device.

Example 44

This example includes any or all of the features of example 43, wherein in response to the term acceptance message, the licensing module is configured to cause the server device to transmit metadata to the client device, the metadata describing where the segment corresponding to the requested content segment is located in the encrypted content.

Example 45

This example includes any or all of the features of example 39, wherein in response to the term rejection message, the licensing module is configured to cause the server device to: inspect the term rejection message for alternative licensing terms; and when the term rejection message includes alternative licensing terms, the licensing module is configured to cause the server device to determine whether the alternative license terms are acceptable or not.

Example 46

This example includes any or all of the features of example 30, wherein the licensing module is further configured to cause the server device to perform an attestation process to determine whether the client device is trusted to enforce licensing terms imposed on the requested content segment.

Example 47

According to this example there is provided a method for selectively licensing content segments, including, with a client device: receiving at least one licensed content segment and a license for the at least one licensed content segment from a server device, the at least one licensed content segment being a portion of corresponding source content that is available for license through the server device, the license imposing one or more restrictions on the at least one licensed content segment; and enforcing the restrictions on the at least one licensed content segment.

Example 48

This example includes any or all of the features of example 47, further including, with the client device: requesting the license for the at least one licensed content segment from the server device.

Example 49

This example includes any or all of the features of example 48, wherein requesting the license includes transmitting a content request message from the client device to the server device, the content request message identifying a requested content segment of a corresponding piece of source content that is available for license through the server device, the requested content segment corresponding to the licensed content segment.

Example 50

This example includes any or all of the features of example 49, further including, with the client device: presenting, via a user interface of the client device, one or more previews of one or more pieces of source content that are available for license though the server device; and in response to one or more inputs received through the user interface, generating the content request message.

Example 51

This example includes any or all of the features of example 48, wherein the content request message includes content selection information, the content selection information being selected from the group consisting of a name of the source content corresponding to the requested content segment, a time frame for the requested content segment, a frame range for the requested content segment, references to one or more characters, actors, figures, scene, locations, colors, sounds, special effects, stunts, stunt persons, animals, or objects, or one or more combinations thereof.

Example 52

This example includes any or all of the features of example 51, wherein the content selection information includes a frame range for the requested content segment, a time frame for the requested content segment, or a combination thereof.

Example 53

This example includes any or all of the features of example 49, wherein the license includes license terms defining the restrictions; and the content request message is configured to cause the server device to determine the license terms, and to transmit a license terms message containing the license terms to the client device.

Example 54

This example includes any or all of the features of example 53, wherein the content request message is configured to cause the server device to determine the license terms at least in part by selecting one or more predetermined licensing terms from a licensing database maintained locally or remotely from the server device.

Example 55

This example includes any or all of the features of example 53, wherein the server device is authorized to license a plurality of predefined content segments; and the content request message is configured to cause the server device to determine the license terms at least in part by determining which of the plurality of predetermined content segments correspond to the requested content segment, and selecting one or more predetermined license terms associated with a predetermined content segment that corresponds to the requested content segment.

Example 56

This example includes any or all of the features of example 53, wherein the content request message is configured to cause the server device to dynamically determine the license terms.

Example 57

This example includes any or all of the features of example 56, wherein the content request message is configured to cause the server device to dynamically determine the license terms at least in part by negotiating the license terms with the client device.

Example 58

This example includes any or all of the features of example 57, wherein the content request message is configured to enable the server device to negotiate the license terms with the client device independent of an input from a user of the client device.

Example 59

This example includes any or all of the features of example 56, wherein the server device is to dynamically determine the license terms based at least in part on contextual information of a user of the client device.

Example 60

This example includes any or all of the features of example 53, wherein the license terms specify a payment for a license to the requested content segment.

Example 61

This example includes any or all of the features of example 60, wherein the payment is selected from the group consisting of a monetary payment, an informational payment, or a combination thereof.

Example 62

This example includes any or all of the features of example 53, further including, with the client device: inspecting the license terms message to identify the license terms specified by the server device; and accepting or rejecting the license terms.

Example 63

This example includes any or all of the features of example 62, wherein the accepting or rejecting is based at least in part on a user input.

Example 64

This example includes any or all of the features of example 62, further including, with the client device: comparing the license terms to a database of acceptable license criteria maintained locally on or remote from the client device; and accepting or rejecting the license terms based at least on part on the comparison of the license terms to the database of acceptable license criteria.

Example 65

This example includes any or all of the features of example 62, wherein: accepting the license terms includes transmitting a term acceptance message to the server device; and rejecting the license terms includes transmitting a term rejection message to the server device.

Example 66

This example includes any or all of the features of example 65, wherein the term acceptance message is configured to cause the server device to cause the transmission of the requested content segment to the client device, the requested content segment corresponding to the licensed content segment.

Example 67

This example includes any or all of the features of example 66, wherein: the requested content segment is a portion of source content available for license via the server device; and the term acceptance message is configured to cause the server device to isolate the requested content segment from the source content.

Example 68

This example includes any or all of the features of example 66, wherein the term acceptance message is further configured to cause the server device to encrypt the requested content segment with a content encryption key to produce encrypted content, and to provide the content encryption key and the encrypted content to the client device.

Example 69

This example includes any or all of the features of example 66, wherein the term acceptance message is configured to cause the server device to: divide the source content into a plurality of segments, wherein one of the plurality of segments corresponds to the requested content segment; encrypt the segment corresponding to the requested content segment with a first content encryption key, and segments other than the segment corresponding to the requested content segment with at least one other content encryption key, thereby producing encrypted content; transmit the encrypted content to the client device; and transmit the first content encryption key to the client device.

Example 70

This example includes any or all of the features of example 69, wherein the term acceptance message is further configured to cause the server device to transmit metadata to the client device, the metadata describing where the segment corresponding to the requested content segment is located in the encrypted content.

Example 71

This example includes any or all of the features of example 68, further including, with the client device: in response to receipt of the encrypted content, decrypting the encrypted content so as to obtain the licensed content segment.

Example 72

According to this example there is provided a method for selectively licensing content segments, including, with a server device: in response to a content request message from a client device identifying a requested content segment, determining license terms for a license to the requested content segment; and transmitting a license terms message containing the license terms to the client device; wherein the requested content segment is a portion of a corresponding piece of source content that is available for license through the server device.

Example 73

This example includes any or all of the features of example 72, wherein determining the license terms includes selecting one or more predetermined license terms from a database of licensing terms maintained locally on or remote from the server device.

Example 74

This example includes any or all of the features of any one of examples 72 and 73, wherein: the server device is authorized to license a plurality of predefined content segments; and determining the license terms for the requested content segment includes determining which of the plurality of predetermining content segments correspond to the requested content segment, and selecting one or more predetermined license terms associated with a predetermined content segment that corresponds to the requested content segment.

Example 75

This example includes any or all of the features of any one of examples 72 to 74, wherein determining the license terms includes dynamically determining the license terms.

Example 76

This example includes any or all of the features of example 75, wherein dynamically determining the license terms includes negotiating the license terms with the client device.

Example 77

This example includes any or all of the features of example 76, wherein the negotiating is performed independent of an input from a user of the client device.

Example 78

This example includes any or all of the features of example 75, wherein the server is to dynamically determine the license terms based at least in part on contextual information of a user of the client device.

Example 79

This example includes any or all of the features of example 72, wherein the license terms specify a payment for a license to the requested content segment.

Example 80

This example includes any or all of the features of example 79, wherein the payment is selected from the group consisting of a monetary payment, an information payment, or a combination thereof.

Example 81

This example includes any or all of the features of example 72, wherein the license terms message is configured to cause the client device to: inspect the license terms message to identify the license terms specified by the server device; and accept or reject the license terms by transmitting a term acceptance or a term rejection message to the server device, respectively.

Example 82

This example includes any or all of the features of example 81, further including, with the server device: transmitting, in response to the term acceptance message, the requested content segment and a license to the requested content segment to the client device.

Example 83

This example includes any or all of the features of example 82, further including, with the server device: isolating, in response to the term acceptance message, the requested content segment from the source content prior to transmitting the required content segment to the client device.

Example 84

This example includes any or all of the features of example 82, further including, with the server device: encrypting, in response to the term acceptance message, the requested content segment with a content encryption key to produce encrypted content; and providing the content encryption key and the encrypted content to the client device.

Example 85

This example includes any or all of the features of example 82, further including, with the server device: in response to the term acceptance message: dividing the source content into a plurality of segments, wherein one of the plurality of segments corresponds to the requested content segment; encrypting the segment corresponding to the requested content segment with a first content encryption key, and segments other than the segment corresponding to the requested content segment with at least one other content encryption key, thereby producing encrypted content; transmitting the encrypted content to the client device; and transmitting the first content encryption key to the client device.

Example 86

This example includes any or all of the features of example 85, further including, with the server device: transmitting, in response to the term acceptance message, metadata to the client device, the metadata describing where the segment corresponding to the requested content segment is located in the encrypted data.

Example 87

This example includes any or all of the features of example 81, further including, with the server device: inspecting, in response to receipt of the term rejection message, the term rejection message for alternative licensing terms; and when the term rejection message includes alternative licensing terms, determining whether the alternative license terms are acceptable or not.

Example 88

This example includes any or all of the features of any one of examples 72 to 87, further including, with the server device: performing an attestation process to determine whether the client device is trusted to enforce licensing terms imposed on the requested content segment.

Example 89

According to this example there is provided at least one computer readable medium including instructions for selectively licensing content segments, which when executed by a client device cause the performance of the following operations including: receiving at least one licensed content segment and a license for the at least one licensed content segment from a server device, the at least one licensed content segment being a portion of corresponding source content that is available for license through the server device, the license imposing one or more restrictions on the at least one licensed content segment; and enforcing the restrictions on the at least one licensed content segment.

Example 90

This example includes any or all of the features of example 89, wherein the instructions when further executed result in the performance of the following operations including, with the client device: requesting the license for the at least one licensed content segment from the server device.

Example 91

This example includes any or all of the features of example 90, wherein requesting the license includes transmitting a content request message from the client device to the server device, the content request message identifying a requested content segment of a corresponding piece of source content that is available for license through the server device, the requested content segment corresponding to the licensed content segment.

Example 92

This example includes any or all of the features of example 91, wherein the instructions when further executed result in the performance of the following operations including: presenting, via a user interface of the client device, one or more previews of one or more pieces of source content that are available for license though the server device; and in response to one or more inputs received through the user interface, generating the content request message.

Example 93

This example includes any or all of the features of any one of examples 90 to 92, wherein the content request message includes content selection information, the content selection information being selected from the group consisting of a name of the source content corresponding to the requested content segment, a time frame for the requested content segment, a frame range for the requested content segment, references to one or more characters, actors, figures, scene, locations, colors, sounds, special effects, stunts, stunt persons, animals, or objects, or one or more combinations thereof.

Example 94

This example includes any or all of the features of example 93, wherein the content selection information includes a frame range for the requested content segment, a time frame for the requested content segment, or a combination thereof.

Example 95

This example includes any or all of the features of example 91, wherein the license includes license terms defining the restrictions; and the content request message is configured to cause the server device to determine the license terms, and to transmit a license terms message containing the license terms to the client device.

Example 96

This example includes any or all of the features of example 95, wherein the content request message is configured to cause the server device to determine the license terms at least in part by selecting one or more predetermined licensing terms from a licensing database maintained locally or remotely from the server device.

Example 97

This example includes any or all of the features of example 95, wherein the server device is authorized to license a plurality of predefined content segments; and the content request message is configured to cause the server device to determine the license terms at least in part by determining which of the plurality of predetermined content segments correspond to the requested content segment, and selecting one or more predetermined license terms associated with a predetermined content segment that corresponds to the requested content segment.

Example 98

This example includes any or all of the features of example 95, wherein the content request message is configured to cause the server device to dynamically determine the license terms.

Example 99

This example includes any or all of the features of example 98, wherein the content request message is configured to cause the server device to dynamically determine the license terms at least in part by negotiating the license terms with the client device.

Example 100

This example includes any or all of the features of example 99, wherein the content request message is configured to enable the server device to negotiate the license terms with the client device independent of an input from a user of the client device.

Example 101

This example includes any or all of the features of example 98, wherein the server device is to dynamically determine the license terms based at least in part on contextual information of a user of the client device.

Example 102

This example includes any or all of the features of example 95, wherein the license terms specify a payment for a license to the requested content segment.

Example 103

This example includes any or all of the features of example 102, wherein the payment is selected from the group consisting of a monetary payment, an informational payment, or a combination thereof.

Example 104

This example includes any or all of the features of example 95, wherein the instructions when further executed result in the performance of the following operations including, with the client device: inspecting the license terms message to identify the license terms specified by the server device; and accepting or rejecting the license terms.

Example 105

This example includes any or all of the features of example 104, wherein the accepting or rejecting is based at least in part on a user input.

Example 106

This example includes any or all of the features of example 104, wherein the instructions when further executed result in the performance of the following operations including, with the client device: comparing the license terms to a database of acceptable license criteria maintained locally on or remote from the client device; and accepting or rejecting the license terms based at least on part on the comparison of the license terms to the database of acceptable license criteria.

Example 107

This example includes any or all of the features of example 104, wherein:
accepting the license terms includes transmitting a term acceptance message to the server device; and rejecting the license terms includes transmitting a term rejection message to the server device.

Example 108

This example includes any or all of the features of example 107, wherein the term acceptance message is configured to cause the server device to cause the transmission of the requested content segment to the client device, the requested content segment corresponding to the licensed content segment.

Example 109

This example includes any or all of the features of example 108, wherein:
the requested content segment is a portion of source content available for license via the server device; and the term acceptance message is configured to cause the server device to isolate the requested content segment from the source content.

Example 110

This example includes any or all of the features of example 108, wherein the term acceptance message is further configured to cause the server device to encrypt the requested content segment with a content encryption key to produce encrypted content, and to provide the content encryption key and the encrypted content to the client device.

Example 111

This example includes any or all of the features of example 108, wherein the term acceptance message is configured to cause the server device to: divide the source content into a plurality of segments, wherein one of the plurality of segments corresponds to the requested content segment; encrypt the segment corresponding to the requested content segment with a first content encryption key, and segments other than the segment corresponding to the requested content segment with at least one other content encryption key, thereby producing encrypted content; transmit the encrypted content to the client device; and transmit the first content encryption key to the client device.

Example 112

This example includes any or all of the features of example 111, wherein the term acceptance message is further configured to cause the server device to transmit metadata to the client device, the metadata describing where the segment corresponding to the requested content segment is located in the encrypted content.

Example 113

This example includes any or all of the features of example 110, further including, with the client device: in response to receipt of the encrypted content, decrypting the encrypted content so as to obtain the licensed content segment.

Example 114

This example includes any or all of the features of example 107, wherein the term rejection message includes alternative licensing terms for the requested content segment.

Example 115

According to this example there is provided at least one computer readable medium including instructions for selectively licensing content segments which when executed by a server device cause the performance of the following operations including: in response to a content request message from a client device identifying a requested content segment, determining license terms for a license to the requested content segment; and transmitting a license terms message containing the license terms to the client device; wherein the requested content segment is a portion of a corresponding piece of source content that is available for license through the server device.

Example 116

This example includes any or all of the features of example 115, wherein determining the license terms includes selecting one or more predetermined license terms from a database of licensing terms maintained locally on or remote from the server device.

Example 117

This example includes any or all of the features of example 115, wherein: the server device is authorized to license a plurality of predefined content segments; and determining the license terms for the requested content segment includes determining which of the plurality of predetermining content segments correspond to the requested content segment, and selecting one or more predetermined license terms associated with a predetermined content segment that corresponds to the requested content segment.

Example 118

This example includes any or all of the features of any one of examples 115 to 117, wherein determining the license terms includes dynamically determining the license terms.

Example 119

This example includes any or all of the features of example 118, wherein dynamically determining the license terms includes negotiating the license terms with the client device.

Example 120

This example includes any or all of the features of example 119, wherein the negotiating is performed independent of an input from a user of the client device.

Example 121

This example includes any or all of the features of example 118, wherein the server is to dynamically determine the license terms based at least in part on contextual information of a user of the client device.

Example 122

This example includes any or all of the features of any one of examples 115 to 122, wherein the license terms specify a payment for a license to the requested content segment.

Example 123

This example includes any or all of the features of example 122, wherein the payment is selected from the group consisting of a monetary payment, an information payment, or a combination thereof.

Example 124

This example includes any or all of the features of example 115, wherein the license terms message is configured to cause the client device to: inspect the license terms message to identify the license terms specified by the server device; and accept or reject the license terms by transmitting a term acceptance or a term rejection message to the server device, respectively.

Example 125

This example includes any or all of the features of example 124, wherein the instructions when further executed result in the performance of the following operations including, with the server device: transmitting, in response to the term acceptance message, the requested content segment and a license to the requested content segment to the client device.

Example 126

This example includes any or all of the features of example 125, wherein the instructions when further executed result in the performance of the following operations including, with the server device: isolating, in response to the term acceptance message, the requested content segment from the source content prior to transmitting the required content segment to the client device.

Example 127

This example includes any or all of the features of example 125, wherein the instructions when further executed result in the performance of the following operations including, with the server device: encrypting, in response to the term acceptance message, the requested content segment with a content encryption key to produce encrypted content; and providing the content encryption key and the encrypted content to the client device.

Example 128

This example includes any or all of the features of example 125, wherein the instructions when further executed result in the performance of the following operations including, with the server device: in response to the term acceptance message: dividing the source content into a plurality of segments, wherein one of the plurality of segments corresponds to the requested content segment; encrypting the segment corresponding to the requested content segment with a first content encryption key, and segments other than the segment corresponding to the requested content segment with at least one other content encryption key, thereby producing encrypted content; transmitting the encrypted content to the client device; and transmitting the first content encryption key to the client device.

Example 129

This example includes any or all of the features of example 128, wherein the instructions when further executed result in the performance of the following operations including, with the server device: transmitting, in response to the term acceptance message, metadata to the client device, the metadata describing where the segment corresponding to the requested content segment is located in the encrypted data.

Example 130

This example includes any or all of the features of example 124, wherein the instructions when further executed result in the performance of the following operations including, with the server device: inspecting, in response to receipt of the term rejection message, the term rejection message for alternative licensing terms; and when the term rejection message includes alternative licensing terms, determining whether the alternative license terms are acceptable or not.

Example 131

This example includes any or all of the features of any one of examples 115 to 131, wherein the instructions when further executed result in the performance of the following operations including, with the server device: performing an attestation process to determine whether the client device is trusted to enforce licensing terms imposed on the requested content segment.

Example 132

According to this example there is provided a content creation device for generating diverse content, including a processor, a memory, and a digital rights management module configured to: produce diverse content from at least a first content segment and a second content segment; generate a metadata package describing the diverse content, the metadata package associating first licensing information with the first content segment and second licensing information with the second content segment; encapsulate the metadata and the diverse content in a first data structure; and store the data structure in the memory.

Example 133

This example includes any or all of the features of example 132, wherein the digital rights management module is further to encrypt the diverse content at least in part by: encrypting the first content segment with a first content encryption key; encrypting the second content segment with a second content encryption key; and the digital rights management module is further to encapsulate the encrypted diverse content in the first data structure.

Example 134

This example includes any or all of the features of example 133, further including a protected environment, wherein: the first and second content encryption keys are stored within the protected environment; and the digital rights management module is to cause the client device to encrypt the diverse content within the protected environment.

Example 135

This example includes any or all of the features of example 134, wherein the protected environment is a trusted execution environment, a secure enclave, or a combination thereof.

Example 136

This example includes any or all of the features of example 133, wherein:
the digital rights management module is to produce the diverse content from at least the first content segment, the second content segment, and a third content segment related to the first content segment; and the digital rights management module is to encrypt the first and third content segments within the first content encryption key.

Example 137

This example includes any or all of the features of example 136, wherein the first and third content segments are related insofar as they are commonly owned, they are subject to identical digital rights management restrictions, or a combination thereof.

Example 138

This example includes any or all of the features of example 132, wherein the metadata package includes at least one content label that includes one or more of a description of the first and second content segments, arrangement information specifying how the first and second content segments are combined in the diverse content, location information specifying where the first and second content segments are located within the diverse content, and licensing information for one or more of the first and second content segments.

Example 139

This example includes any or all of the features of example 138, wherein the metadata package includes a description of the first and second content segments, wherein the description of the first content segment is associated with a location of the first content segment in the diverse content, and the description of the second content segment is associated with a location of the second content segment in the diverse content.

Example 140

This example includes any or all of the features of example 138, wherein: the diverse content has a length; the metadata package includes at least a location of the first content segment in the diverse content and a location of the second content segment in the diverse content; the location of the first content segment corresponds to a first portion of the length of the diverse content; the location of the second content segment corresponding to a second portion of the length of the diverse content; and the first and second portion fully or partially overlap one another, or are distinct from one another.

Example 141

This example includes any or all of the features of example 138, wherein the at least one content label includes licensing information for one or more of the first content segment and the second content segment, wherein the licensing information includes a pointer, the pointer configured to identify how a license for one or more of the first and second content segments may be obtained.

Example 142

This example includes any or all of the features of example 141, wherein the pointer is configured to cause a consumption device to attempt to obtain a license for at least one of the first content segment and the second content segment.

Example 143

This example includes any or all of the features of example 141, wherein the pointer is configured to cause a consumption device to attempt to obtain a license for at least one of the first content segment and the second content segment independent of input from a user of the consumption device.

Example 144

This example includes any or all of the features of example 141, wherein the licensing information includes first licensing information for the first content segment and second licensing information for the second content segment, wherein the first licensing information and the second licensing information are the same or different.

Example 145

This example includes any or all of the features of example 144, wherein the first licensing information and the second licensing information are different.

Example 146

This example includes any or all of the features of example 132, wherein the metadata package includes a tag configured to serve as evidence of at least one of provenance and history of one or more of the first content segment, the second content segment, or a combination thereof.

Example 147

This example includes any or all of the features of example 146, wherein the tag includes a hash of one or more of the first content segment, the second content segment, or a combination thereof.

Example 148

According to this example there is provided a consumption device for consuming diverse content, including a processor, a memory, and a digital rights management module, wherein the digital rights management module is configured to: in response to receipt of a data structure including diverse content and a metadata package, the diverse content including at least a first content segment and second content segment, analyze the metadata package to determine first licensing restrictions associated with the first content segment and second licensing restrictions associated with the second content segment; and obtain a license to at least one of the first and second content segments from a server device.

Example 149

This example includes any or all of the features of example 148, wherein the metadata package includes at least one pointer that designates the server device as a source of a license to one or more of the first content segment and the second content segment, and the digital rights management module is to obtain the license to at least one of the first and second content segments based at least in part on the pointer.

Example 150

This example includes any or all of the features of any one of examples 148 and 149, wherein the digital rights management module is to obtain the license to at least one of the first and second content segments at least in part by transmitting a license request message to the server device.

Example 151

This example includes any or all of the features of example 150, wherein the license request message specifies one or more of the source of at least one of the first and second content segments, an identity of at least one of the first and second content segments, a portion of source content corresponding to at least one of the first and second content segments, or a combination thereof.

Example 152

This example includes any or all of the features of example 150, wherein the license request message is configured to cause the server device to determine license terms applicable to at least one of the first content segment and the second content segment, and to transmit a license terms message to the consumption device.

Example 153

This example includes any or all of the features of example 152, wherein the license request message is configured to cause the server device to determine the license terms at least in part by selecting one or more predetermined license terms from a licensing database maintained locally or remotely from the server device.

Example 154

This example includes any or all of the features of example 152, wherein: the server device is authorized to license a plurality of predefined content segments; and the license request message is configured to cause the server device to determine the license terms at least in part by determining which of the plurality of predetermined content segments corresponds to at least one of the first content segment and the second content segment, and selecting one or more predetermined license terms associated with a predetermined content segment that corresponds to at least one of the first content segment and the second content segment.

Example 155

This example includes any or all of the features of example 152, wherein the license request message is configured to cause the server device to dynamically determine the license terms.

Example 156

This example includes any or all of the features of example 155, wherein the license request message is configured to cause the server device to dynamically determine the license terms at least in part by negotiating the license terms with the consumption device.

Example 157

This example includes any or all of the features of example 156, wherein the license request message is configured to enable the server device to negotiate the license terms with the consumption device independent of an input from a user of the consumption device.

Example 158

This example includes any or all of the features of example 155, wherein the server device is to dynamically determine the license terms based at least in part on contextual information of a user of the consumption device.

Example 159

This example includes any or all of the features of example 152, wherein in response to the license terms message, the digital rights management module is configured to: inspect the license terms message to identify the license terms specified by the server device; and accept or reject the license terms.

Example 160

This example includes any or all of the features of example 159, wherein the digital rights management module is configured to: compare the license terms to a database of acceptable license criteria maintained locally on or remote from the consumption device; and accept or reject the license terms based at least in part on the comparison of the license terms to the database of acceptable license criteria.

Example 161

This example includes any or all of the features of example 159, wherein the consumption device is further configured to transmit a term acceptance message to the server device when the license terms are accepted, and to transmit a term rejection message to the server device when the license terms are rejected.

Example 162

This example includes any or all of the features of example 161, wherein the term rejection message includes alternative licensing terms for at least one of the first and second content segments.

Example 163

This example includes any or all of the features of example 161, wherein the first and second content segments in the diverse content are encrypted, and the term acceptance message is configured to cause the server device to cause the transmission of a first content encryption key and a second content encryption key to the consumption device, the first content encryption key configured to enable decryption of the first content segment, the second content encryption key configured to enable decryption of the second content segment.

Example 164

This example includes any or all of the features of any one of examples 150 to 163, wherein prior to transmitting the license request message, the digital rights management module is configured to cause the consumption device to execute an attestation process with the server device.

Example 165

This example includes any or all of the features of example 164, wherein during the attestation process, the consumption device attests to its ability to enforce the first and second licensing restrictions.

Example 166

This example includes any or all of the features of any one of examples 150 to 165, wherein: the diverse content is encrypted; the consumption device further includes a protected environment; and the digital rights management module is configured to cause the client device to decrypt the encrypted diverse content within the protected environment with one or more content encryption keys.

Example 167

This example includes any or all of the features of example 166, wherein the one or more content encryption keys are stored within the protected environment.

Example 168

This example includes any or all of the features of example 166, wherein prior to decrypting the encrypted diverse content, the digital rights management module is configured to cause the consumption device to obtain the one or more content encryption keys from a content creation device or the server device.

Example 169

This example includes any or all of the features of example 166, wherein the protected environment is a trusted execution environment, a secure enclave, or a combination thereof.

Example 170

This example includes any or all of the features of example 148, wherein the digital rights management module is further configured to enforce the first licensing restrictions on the first content segment and the second licensing restrictions on the second content segment.

Example 171

This example includes any or all of the features of example 152, wherein the license terms specify a payment for a license to at least one of the first content segment and the second content segment.

Example 172

This example includes any or all of the features of example 171, wherein the digital rights management module is further configured to: cause the consumption device to monitor the use of the first and second content segments by the consumption device; and provide, based on the monitoring of the use of the first and second content segments, the payment to the server device, an owner of the first content segment, an owner of the second content segment, or a combination thereof.

Example 173

This example includes any or all of the features of example 172, wherein the digital rights management module is further configured to apportion the payment among the first content owner and the second content owner based at least in part on the monitoring of the use of the first and second content segments.

Example 174

This example includes any or all of the features of example 172, wherein the payment is an informational payment, and the digital rights management module is further configured to: collect information corresponding to the informational payment in the form of metadata; and provide the metadata to at least one of the server device, an owner of the first content segment, and an owner of the second content segment.

Example 175

This example includes any or all of the features of example 174, wherein the digital rights management module is further configured to encrypt the metadata with at least one public additive homomorphic encryption key prior to providing the metadata to at least one of the server device, the owner of the first content segment, and the owner of the second content segment.

Example 176

This example includes any or all of the features of example 174, wherein: the metadata includes first usage information regarding the use of the first content segment and second usage information regarding the use of the second content segment; the digital rights management module is configured to encrypt the first usage information with a first instance of a public additive homomorphic encryption key, and the second usage information with a second instance of a public additive homomorphic encryption key; and the digital rights management module is configured to cause the consumption device to provide at least one of the metadata and the first instance of the public additive homomorphic encryption key to the owner of the first content segment, and the metadata and the second instance of a public additive homomorphic encryption key to the owner of the second content segment.

Example 177

According to this example there is provided a method for generating diverse content, including, with a content creation device: producing diverse content from at least a first content segment and a second content segment; encrypting the diverse content, thereby generating encrypted diverse content; generating a metadata package describing the diverse content, the metadata package associating first licensing information with the first content segment and second licensing information with the second content segment; encapsulating the metadata and the encrypted diverse content in a first data structure; and storing the data structure in a memory of the content creation device.

Example 178

This example includes any or all of the features of example 177, wherein the encrypting includes: encrypting the first content segment with a first content encryption key; and encrypting the second content segment with a second content encryption key.

Example 179

This example includes any or all of the features of example 178, wherein the content creation device includes protected environment and the method further includes: storing the first and second content encryption keys within the protected environment; and performing the encrypting within the protected environment.

Example 180

This example includes any or all of the features of example 179, wherein the protected environment is a trusted execution environment, a secure enclave, or a combination thereof.

Example 181

This example includes any or all of the features of example 178, further including: producing the diverse content from at least the first content segment, the second content segment, and a third content segment related to the first content segment; and encrypting the first and third content segments within the first content encryption key.

Example 182

This example includes any or all of the features of example 181, wherein the first and third content segments are related insofar as they are commonly owned, they are subject to identical digital rights management restrictions, or a combination thereof.

Example 183

This example includes any or all of the features of any one of examples 177 to 182, wherein the metadata package includes at least one content label that includes one or more of a description of the first and second content segments, arrangement information specifying how the first and second content segments are combined in the diverse content, location information specifying where the first and second content segments are located within the diverse content, and licensing information for one or more of the first and second content segments.

Example 184

This example includes any or all of the features of example 183, wherein the metadata package includes a description of the first and second content segments, wherein the description of the first content segment is associated with a location of the first content segment in the diverse content, and the description of the second content segment is associated with a location of the second content segment in the diverse content.

Example 185

This example includes any or all of the features of example 183, wherein: the diverse content has a length; the metadata package includes at least a location of the first content segment in the diverse content and a location of the second content segment in the diverse content; the location of the first content segment corresponds to a first portion of the length of the diverse content; the location of the second content segment corresponding to a second portion of the length of the diverse content; and the first and second portion fully or partially overlap one another, or are distinct from one another.

Example 186

This example includes any or all of the features of example 183, wherein the at least one content label includes licensing information for one or more of the first content segment and the second content segment, wherein the licensing information includes a pointer, the pointer configured to identify how a license for one or more of the first and second content segments may be obtained.

Example 187

This example includes any or all of the features of example 186, wherein the pointer is configured to cause a consumption device to attempt to obtain a license for at least one of the first content segment and the second content segment.

Example 188

This example includes any or all of the features of example 186, wherein the pointer is configured to cause a consumption device to attempt to obtain a license for at least one of the first content segment and the second content segment independent of input from a user of the consumption device.

Example 189

This example includes any or all of the features of example 186, wherein the licensing information includes first licensing information for the first content segment and second licensing information for the second content segment, wherein the first licensing information and the second licensing information are the same or different.

Example 190

This example includes any or all of the features of example 189, wherein the first licensing information and the second licensing information are different.

Example 191

This example includes any or all of the features of any one of examples 177 to 190, wherein the metadata package includes a tag configured to serve as evidence of at least one of provenance and history of one or more of the first content segment, the second content segment, or a combination thereof.

Example 192

This example includes any or all of the features of example 191, wherein the tag includes a hash of one or more of the first content segment, the second content segment, or a combination thereof.

Example 193

According to this example there is provided a method for consuming diverse content with a consumption device, including, with the consumption device: in response to receipt of a data structure including encrypted diverse content and a metadata package, the encrypted diverse content including at least a first content segment and second content segment, analyzing the metadata package to determine first licensing restrictions associated with the first content segment and second licensing restrictions associated with the second content segment; and obtaining a license to at least one of the first and second content segments from a server device.

Example 194

This example includes any or all of the features of example 193, wherein the metadata package includes at least one pointer that designates the server device as a source of a license to one or more of the first content segment and the second content segment, and the method further includes obtaining the license to at least one of the first and second content segments based at least in part on the pointer.

Example 195

This example includes any or all of the features of any one of examples 193 and 194, wherein the obtaining includes transmitting a license request message to the server device.

Example 196

This example includes any or all of the features of example 195, wherein the license request message specifies one or more of the source of at least one of the first and second content segments, an identity of at least one of the first and second content segments, a portion of source content corresponding to at least one of the first and second content segments, or a combination thereof.

Example 197

This example includes any or all of the features of example 195, wherein the license request message is configured to cause the server device to determine license terms applicable to at least one of the first content segment and the second content segment, and to transmit a license terms message to the consumption device.

Example 198

This example includes any or all of the features of example 197, wherein the license request message is configured to cause the server device to determine the license terms at least in part by selecting one or more predetermined license terms from a licensing database maintained locally or remotely from the server device.

Example 199

This example includes any or all of the features of example 197, wherein: the server device is authorized to license a plurality of predefined content segments; and the license request message is configured to cause the server device to determine the license terms at least in part by determining which of the plurality of predetermined content segments corresponds to at least one of the first content segment and the second content segment, and selecting one or more predetermined license terms associated with a predetermined content segment that corresponds to at least one of the first content segment and the second content segment.

Example 200

This example includes any or all of the features of example 197, wherein the license request message is configured to cause the server device to dynamically determine the license terms.

Example 201

This example includes any or all of the features of example 200, wherein the license request message is configured to cause the server device to dynamically determine the license terms at least in part by negotiating the license terms with the consumption device.

Example 202

This example includes any or all of the features of example 201, wherein the license request message is configured to enable the server device to negotiate the license terms with the consumption device independent of an input from a user of the consumption device.

Example 203

This example includes any or all of the features of example 200, wherein the server device is to dynamically determine the license terms based at least in part on contextual information of a user of the consumption device.

Example 204

This example includes any or all of the features of example 197, further including, with the consumption device: in response to the license terms message, inspecting the license terms message to identify the license terms specified by the server device; and accepting or rejecting the license terms.

Example 205

This example includes any or all of the features of example 204, further including, with the consumption device: comparing the license terms to a database of acceptable license criteria; and accepting or rejecting the license terms based at least in part on the comparison of the license terms to the database of acceptable license criteria.

Example 206

This example includes any or all of the features of example 204, further including, with the consumption device: transmitting a term acceptance message to the server device when the license terms are accepted; and transmitting a term rejection message to the server device when the license terms are rejected.

Example 207

This example includes any or all of the features of example 206, wherein the term rejection message includes alternative licensing terms for at least one of the first and second content segments.

Example 208

This example includes any or all of the features of example 206, wherein the term acceptance message is configured to cause the server device to cause the transmission of a first content encryption key and a second content encryption key to the consumption device, the first content encryption key configured to enable decryption of the first content segment, the second content encryption key configured to enable decryption of the second content segment.

Example 209

This example includes any or all of the features of example 195, further including, with the consumption device: prior to transmitting the license request message, executing an attestation process with the server device.

Example 210

This example includes any or all of the features of example 209, wherein the attestation process includes attesting, with the consumption device, to the ability of the consumption device to enforce the first and second licensing restrictions.

Example 211

This example includes any or all of the features of example 195, wherein the consumption device includes a protected environment, and the method further includes, with the consumption device: decrypting the encrypted diverse content within the protected environment with one or more content encryption keys.

Example 212

This example includes any or all of the features of example 211, further including, with the consumption device: storing the one or more content encryption keys within the protected environment.

Example 213

This example includes any or all of the features of example 211, further including, with the consumption device: prior to decrypting the encrypted diverse content, obtaining the one or more content encryption keys from a content creation device or the server device.

Example 214

This example includes any or all of the features of example 211, wherein the protected environment is a trusted execution environment, a secure enclave, or a combination thereof.

Example 215

This example includes any or all of the features of any one of examples 193 to 214, further including, with the consumption device: enforcing the first licensing restrictions on the first content segment and the second licensing restrictions on the second content segment.

Example 216

This example includes any or all of the features of example 197, wherein the license terms specifies a payment for a license to at least one of the first content segment and the second content segment.

Example 217

This example includes any or all of the features of example 216, further including, with the consumption device: monitoring the use of the first and second content segments; and providing, based on the monitoring, the payment to the server device, an owner of the first content segment, an owner of the second content segment, or a combination thereof.

Example 218

This example includes any or all of the features of example 217, further including, with the consumption device: apportioning the payment among the first content owner and the second content owner based at least in part on the monitoring.

Example 219

This example includes any or all of the features of example 217, wherein the payment is an informational payment, and the method further includes, with the consumption device: collecting information corresponding to the informational payment in the form of metadata; and providing the metadata to at least one of the server device, an owner of the first content segment, and an owner of the second content segment.

Example 220

This example includes any or all of the features of example 219, further including, with the consumption device: encrypting the metadata with at least one public additive homomorphic encryption key prior to providing the metadata to at least one of the server device, the owner of the first content segment, and the owner of the second content segment.

Example 221

This example includes any or all of the features of example 219, wherein the metadata includes first usage information regarding the use of the first content segment and second usage information regarding the use of the second content segment, and the method further includes, with the consumption device: encrypting the first usage information with a first instance of a public additive homomorphic encryption key; encrypting the second usage information with a second instance of a public additive homomorphic encryption key; and providing at least one of the metadata and the first instance of a public additive homomorphic encryption key to the owner of the first content segment, and the metadata and the second instance of the public additive homomorphic encryption key to the owner of the second content segment.

Example 222

According to this example there is provided at least one computer readable medium including instructions for creating diverse content with a content creation device, wherein the instructions when executed cause the content creation device to perform the following operations including: producing diverse content from at least a first content segment and a second content segment; encrypting the diverse content, thereby generating encrypted diverse content; generating a metadata package describing the diverse content, the metadata package associating first licensing information with the first content segment and second licensing information with the second content segment; encapsulating the metadata and the encrypted diverse content in a first data structure; and storing the data structure in a memory of the content creation device.

Example 223

This example includes any or all of the features of example 222, wherein the encrypting includes: encrypting the first content segment with a first content encryption key; and encrypting the second content segment with a second content encryption key.

Example 224

This example includes any or all of the features of example 223, wherein the content creation device includes protected environment and the instructions when executed further result in the performance of the following operations including: storing the first and second content encryption keys within the protected environment; and performing the encrypting within the protected environment.

Example 225

This example includes any or all of the features of example 224, wherein the protected environment is a trusted execution environment, a secure enclave, or a combination thereof.

Example 226

This example includes any or all of the features of example 223, wherein the instructions when executed further cause the performance of the following operations including: producing the diverse content from at least the first content segment, the second content segment, and a third content segment related to the first content segment; and encrypting the first and third content segments within the first content encryption key.

Example 227

This example includes any or all of the features of example 226, wherein the first and third content segments are related insofar as they are commonly owned, they are subject to identical digital rights management restrictions, or a combination thereof.

Example 228

This example includes any or all of the features of any one of examples 222 to 227, wherein the metadata package includes at least one content label that includes one or more of a description of the first and second content segments, arrangement information specifying how the first and second content segments are combined in the diverse content, location information specifying where the first and second content segments are located within the diverse content, and licensing information for one or more of the first and second content segments.

Example 229

This example includes any or all of the features of example 228, wherein the metadata package includes a description of the first and second content segments, wherein the description of the first content segment is associated with a location of the first content segment in the diverse content, and the description of the second content segment is associated with a location of the second content segment in the diverse content.

Example 230

This example includes any or all of the features of example 228, wherein: the diverse content has a length; the metadata package includes at least a location of the first content segment in the diverse content and a location of the second content segment in the diverse content; the location of the first content segment corresponds to a first portion of the length of the diverse content; the location of the second content segment corresponding to a second portion of the length of the diverse content; and the first and second portion fully or partially overlap one another, or are distinct from one another.

Example 231

This example includes any or all of the features of example 228, wherein the at least one content label includes licensing information for one or more of the first content segment and the second content segment, wherein the licensing information includes a pointer, the pointer configured to identify how a license for one or more of the first and second content segments may be obtained.

Example 232

This example includes any or all of the features of example 231, wherein the pointer is configured to cause a consumption device to attempt to obtain a license for at least one of the first content segment and the second content segment.

Example 233

This example includes any or all of the features of example 231, wherein the pointer is configured to cause a consumption device to attempt to obtain a license for at least one of the first content segment and the second content segment independent of input from a user of the consumption device.

Example 234

This example includes any or all of the features of example 231, wherein the licensing information includes first licensing information for the first content segment and second licensing information for the second content segment, wherein the first licensing information and the second licensing information are the same or different.

Example 235

This example includes any or all of the features of example 234, wherein the first licensing information and the second licensing information are different.

Example 236

This example includes any or all of the features of any one of examples 222 to 235, wherein the metadata package includes a tag configured to serve as evidence of at least one of provenance and history of one or more of the first content segment, the second content segment, or a combination thereof.

Example 237

This example includes any or all of the features of example 236, wherein the tag includes a hash of one or more of the first content segment, the second content segment, or a combination thereof.

Example 238

According to this example there is provided at least one computer readable medium including instructions for creating diverse content with a content consumption device, wherein the instructions when executed cause the content consumption device to perform the following operations including: in response to receipt of a data structure including encrypted diverse content and a metadata package, the encrypted diverse content including at least a first content segment and second content segment, analyzing the metadata package to determine first licensing restrictions associated with the first content segment and second licensing restrictions associated with the second content segment; and obtaining a license to at least one of the first and second content segments from a server device.

Example 239

This example includes any or all of the features of example 238, wherein the metadata package includes at least one pointer that designates the server device as a source of a license to one or more of the first content segment and the second content segment, and the instructions when executed further cause the performance of the following operations including: obtaining the license to at least one of the first and second content segments based at least in part on the pointer.

Example 240

This example includes any or all of the features of any one of examples 238 to 239, wherein the obtaining includes transmitting a license request message to the server device.

Example 241

This example includes any or all of the features of example 240, wherein the license request message specifies one or more of the source of at least one of the first and second content segments, an identity of at least one of the first and second content segments, a portion of source content corresponding to at least one of the first and second content segments, or a combination thereof.

Example 242

This example includes any or all of the features of example 240, wherein the license request message is configured to cause the server device to determine license terms applicable to at least one of the first content segment and the second content segment, and to transmit a license terms message to the consumption device.

Example 243

This example includes any or all of the features of example 242, wherein the license request message is configured to cause the server device to determine the license terms at least in part by selecting one or more predetermined license terms from a licensing database maintained locally or remotely from the server device.

Example 244

This example includes any or all of the features of example 242, wherein: the server device is authorized to license a plurality of predefined content segments; and the license request message is configured to cause the server device to determine the license terms at least in part by determining which of the plurality of predetermined content segments corresponds to at least one of the first content segment and the second content segment, and selecting one or more predetermined license terms associated with a predetermined content segment that corresponds to at least one of the first content segment and the second content segment.

Example 245

This example includes any or all of the features of example 242, wherein the license request message is configured to cause the server device to dynamically determine the license terms.

Example 246

This example includes any or all of the features of example 245, wherein the license request message is configured to cause the server device to dynamically determine the license terms at least in part by negotiating the license terms with the consumption device.

Example 247

This example includes any or all of the features of example 246, wherein the license request message is configured to enable the server device to negotiate the license terms with the consumption device independent of an input from a user of the consumption device.

Example 248

This example includes any or all of the features of example 245, wherein the server device is to dynamically determine the license terms based at least in part on contextual information of a user of the consumption device.

Example 249

This example includes any or all of the features of example 242, wherein the instructions when executed further cause the performance of the following operations including: in response to the license terms message, inspecting the license terms message to identify the license terms specified by the server device; and accepting or rejecting the license terms.

Example 250

This example includes any or all of the features of example 249, wherein the instructions when executed further cause the performance of the following operations including: comparing the license terms to a database of acceptable license criteria; and accepting or rejecting the license terms based at least in part on the comparison of the license terms to the database of acceptable license criteria.

Example 251

This example includes any or all of the features of example 249, wherein the instructions when executed further cause the performance of the following operations including: transmitting a term acceptance message to the server device when the license terms are accepted; and transmitting a term rejection message to the server device when the license terms are rejected.

Example 252

This example includes any or all of the features of example 251, wherein the term rejection message includes alternative licensing terms for at least one of the first and second content segments.

Example 253

This example includes any or all of the features of example 251, wherein the term acceptance message is configured to cause the server device to cause the transmission of a first content encryption key and a second content encryption key to the consumption device, the first content encryption key configured to enable decryption of the first content segment, the second content encryption key configured to enable decryption of the second content segment.

Example 254

This example includes any or all of the features of example 240, wherein the instructions when executed further cause the performance of the following operations including: prior to transmitting the license request message, executing an attestation process with the server device.

Example 255

This example includes any or all of the features of example 254, wherein the attestation process includes attesting, with the consumption device, to the ability of the consumption device to enforce the first and second licensing restrictions.

Example 256

This example includes any or all of the features of example 240, wherein the consumption device includes a protected environment, and the instructions when executed further cause the performance of the following operations including: decrypting the encrypted diverse content within the protected environment with one or more content encryption keys.

Example 257

This example includes any or all of the features of example 256, wherein the instructions when executed further cause the performance of the following operations including: storing the one or more content encryption keys within the protected environment.

Example 258

This example includes any or all of the features of example 256, wherein the instructions when executed further cause the performance of the following operations including: prior to decrypting the encrypted diverse content, obtaining the one or more content encryption keys from a content creation device or the server device.

Example 259

This example includes any or all of the features of example 256, wherein the protected environment is a trusted execution environment, a secure enclave, or a combination thereof.

Example 260

This example includes any or all of the features of any one of examples 238 to 259, wherein the instructions when executed further cause the performance of the following operations including: enforcing the first licensing restrictions on the first content segment and the second licensing restrictions on the second content segment.

Example 261

This example includes any or all of the features of example 242, wherein the license terms specifies a payment for a license to at least one of the first content segment and the second content segment.

Example 262

This example includes any or all of the features of example 261, wherein the instructions when executed further cause the performance of the following operations including: monitoring the use of the first and second content segments; and providing, based on the monitoring, the payment to the server device, an owner of the first content segment, an owner of the second content segment, or a combination thereof.

Example 263

This example includes any or all of the features of example 262, wherein the instructions when executed further cause the performance of the following operations including: apportioning the payment among the first content owner and the second content owner based at least in part on the monitoring.

Example 264

This example includes any or all of the features of example 262, wherein the payment is an informational payment, and the instructions when executed further cause the performance of the following operations including: collecting information corresponding to the informational payment in the form of metadata; and providing the metadata to at least one of the server device, an owner of the first content segment, and an owner of the second content segment.

Example 265

This example includes any or all of the features of example 264, wherein the instructions when executed further cause the performance of the following operations including: encrypting the metadata with at least one public additive homomorphic encryption key prior to providing the metadata to at least one of the server device, the owner of the first content segment, and the owner of the second content segment.

Example 266

This example includes any or all of the features of example 264, wherein the metadata includes first usage information regarding the use of the first content segment and second usage information regarding the use of the second content segment, and the instructions when executed further cause the performance of the following operations including: encrypting the first usage information with a first instance of a public additive homomorphic encryption key; encrypting the second usage information with a second instance of a public additive homomorphic encryption key; and providing at least one of the metadata and the first instance of the public additive homomorphic encryption key to the owner of the first content segment, and the metadata and the second instance of the public additive homomorphic encryption key to the owner of the second content segment.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The invention claimed is:

1. A client device for selectively licensing content segments, comprising a processor, a memory, and digital rights management circuitry, wherein:
the client device to:
receive at least one licensed content segment and a license for the at least one licensed content segment from a server device;
wherein the at least one licensed content segment comprises a portion of corresponding source content that is available for license through the server device; and
wherein the license imposes one or more restrictions on the at least one licensed content segment; and
the digital rights management circuitry to cause the client device to:
transmit, to the server device, a content request message identifying a requested content segment of a corresponding piece of source content that is available for license through the server device;
request, from the server device, a license for the requested content segment;
receive, from the server device, the license for the requested content segment; and
compare terms included in the received license with terms included in the acceptable licensing terms database; and
propose an alternative term selected from the acceptable licensing terms database to the server device for each term included in the received license that is absent from the acceptable licensing terms database.

2. The client device of claim 1, wherein the content request message comprises content selection information, said content selection information being selected from the group consisting of a name of the source content corresponding to the requested content segment, a time frame for the requested content segment, a frame range for the requested content segment, references to one or more characters, actors, figures, scene, locations, colors, sounds, special effects, stunts, stunt persons, animals, or objects, or one or more combinations thereof.

3. The client device of claim 2, wherein:
the license comprises license terms governing the use of the licensed content segment; and
the digital rights management module is further operable to enforce said license terms.

4. The client device of claim 3, wherein the content request message is operable to cause the server device to determine said license terms, and to transmit a license terms message containing said license terms to said client device.

5. The client device of claim 4, wherein:
said server device is authorized to license a plurality of predefined content segments; and
the content request message is operable to cause the server device to determine said license terms at least in part by determining which of the plurality of predetermined content segments corresponds to the requested content segment, and selecting one or more predetermined license terms associated with a predetermined content segment that corresponds to the requested content segment.

6. The client device of claim 1, wherein said client device further comprises a protected environment, and the digital rights management module is maintained within the protected environment.

7. The client device of claim 1 wherein the server device to dynamically determine said license terms comprises using a user preference database to provide license terms that may be considered acceptable to a user.

8. The client device of claim 7 wherein the user preference database is populated by consulting a user context subsystem containing contextual information including one or more of previous content licenses with the user, user behavior with regard to the consumption of samples of previously unlicensed content, and analytics information regarding user searches.

9. A method for selectively licensing content segments, comprising, with a client device:
receiving, at the client device, at least one licensed content segment and a license for the at least one licensed content segment from a server device;

wherein the at least one licensed content segment includes a portion of corresponding source content that is available for license through the server device; and wherein the license imposing one or more restrictions on the at least one licensed content segment; and transmitting, by the client device, a content request message to the server device, wherein requesting the license comprises:

identifying a requested content segment of a corresponding piece of source content that is available for license through the server device;

requesting, from the server device, a license for the requested content segment;

receiving, from the server device, the licenses for the requested content segment: and comparing terms included in the received license with terms included in the acceptable licensing terms database; and proposing an alternative term selected from the acceptable licensing terms database to the server device for each term included in the received license that is absent from the acceptable licensing terms database.

10. The method of claim 9, wherein the content request message comprises content selection information, said content selection information being selected from the group consisting of a name of the source content corresponding to the requested content segment, a time frame for the requested content segment, a frame range for the requested content segment, references to one or more characters, actors, figures, scene, locations, colors, sounds, special effects, stunts, stunt persons, animals, or objects, or one or more combinations thereof.

11. The method of claim 10, wherein the license comprises license terms defining said restrictions; and the content request message is configured to cause the server device to determine said license terms, and to transmit a license terms message containing said license terms to said client device.

12. The method of claim 11, wherein the content request message is configured to cause the server device to determine said license terms at least in part by selecting one or more predetermined licensing terms from a licensing database maintained locally or remotely from the server device.

13. The method of claim 11, wherein said server device is authorized to license a plurality of predefined content segments; and the content request message is configured to cause the server device to determine said license terms at least in part by determining which of the plurality of predetermined content segments correspond to the requested content segment.

14. The method of claim 9 wherein the server device dynamically determines said license terms comprises using a user preference database to provide license terms that may be considered acceptable to a user.

15. The method of claim 14 wherein the user preference database is populated by consulting a user context subsystem containing contextual information including one or more of previous content licenses with the user, user behavior with regard to the consumption of samples of previously unlicensed content, and analytics information regarding user searches.

16. At least one non-transitory computer readable medium comprising instructions for selectively licensing content segments which when executed by a client device cause the performance of the following operations comprising:

receiving, at the client device, at least one licensed content segment and a license for the at least one licensed content segment from a server device;

wherein the at least one licensed content segment includes a portion of corresponding source content that is available for license through the server device; and wherein the license imposing one or more restrictions on the at least one licensed content segment; and transmitting, by the client device, a content request message to the server device, wherein requesting the license comprises:

identifying a requested content segment of a corresponding piece of source content that is available for license through the server device;

requesting, from the server device, a license for the requested content segment;

receiving, from the server device, the licenses for the requested content segment: and comparing terms included in the received license with terms included in the acceptable licensing terms database; and proposing an alternative term selected from the acceptable licensing terms database to the server device for each term included in the received license that is absent from the acceptable licensing terms database.

17. The at least one non-transitory computer readable medium of claim 16, wherein the content request message comprises content selection information, said content selection information being selected from the group consisting of a name of the source content corresponding to the requested content segment, a time frame for the requested content segment, a frame range for the requested content segment, references to one or more characters, actors, figures, scene, locations, colors, sounds, special effects, stunts, stunt persons, animals, or objects, or one or more combinations thereof.

18. The at least one non-transitory computer readable medium of claim 16, wherein the license comprises license terms defining said restrictions; and the content request message is configured to cause the server device to determine said license terms, and to transmit a license terms message containing said license terms to said client device.

19. The at least one non-transitory computer readable medium of claim 18, wherein the content request message is configured to cause the server device to determine said license terms at least in part by selecting one or more predetermined licensing terms from a licensing database maintained locally or remotely from the server device.

20. The at least one non-transitory computer readable medium of claim 19, wherein said server device is authorized to license a plurality of predefined content segments; and the content request message is configured to cause the server device to determine said license terms at least in part by determining which of the plurality of predetermined content segments correspond to the requested content segment, and selecting one or more predetermined license terms associated with a predetermined content segment that corresponds to the requested content segment.

21. The at least one non-transitory computer readable medium of claim 16 further comprising instructions wherein the server device to dynamically determine said license terms comprises using a user preference database to provide license terms that may be considered acceptable to a user.

22. The at least one non-transitory computer readable medium of claim 21 further comprising instructions wherein the user preference database is populated by consulting a user context subsystem containing contextual information including one or more of previous content licenses with the user, user behavior with regard to the consumption of samples of previously unlicensed content, and analytics information regarding user searches.

* * * * *